US012294147B2

(12) United States Patent
Parsche

(10) Patent No.: US 12,294,147 B2
(45) Date of Patent: May 6, 2025

(54) COMMUNICATIONS DEVICE WITH HELICAL SLOT RADIATING ANTENNA AND RELATED ANTENNA DEVICE AND METHOD

(71) Applicant: Eagle Technology, LLC, Melbourne, FL (US)

(72) Inventor: Francis E. Parsche, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 139 days.

(21) Appl. No.: 18/048,092

(22) Filed: Oct. 20, 2022

(65) Prior Publication Data

US 2024/0136727 A1 Apr. 25, 2024
US 2024/0235045 A9 Jul. 11, 2024

(51) Int. Cl.
*H01Q 13/12* (2006.01)
*H01Q 1/48* (2006.01)
*H01Q 1/50* (2006.01)

(52) U.S. Cl.
CPC ............... *H01Q 13/12* (2013.01); *H01Q 1/48* (2013.01); *H01Q 1/50* (2013.01)

(58) Field of Classification Search
CPC ............ H01Q 13/12; H01Q 1/48; H01Q 1/50; H01Q 9/0407; H01Q 9/0442
See application file for complete search history.

(56) References Cited

U.S. PATENT DOCUMENTS

| | | | |
|---|---|---|---|
| 3,573,840 | A | 4/1971 | Gouillou et al. |
| 3,962,748 | A | 6/1976 | Michaels |
| 4,494,117 | A | 1/1985 | Coleman |
| 4,667,440 | A | 5/1987 | Grace, Sr. |
| 4,825,219 | A | 4/1989 | Ajioka |
| 4,872,020 | A | 10/1989 | Ajioka |
| 5,329,287 | A | 7/1994 | Strickland |
| 5,345,248 | A | 9/1994 | Hwang et al. |
| 5,479,182 | A | 12/1995 | Sydor |
| 5,892,480 | A | 4/1999 | Killen |
| 5,924,324 | A | 7/1999 | Kilker et al. |

(Continued)

FOREIGN PATENT DOCUMENTS

| | | |
|---|---|---|
| CN | 101060203 | 10/2007 |
| CN | 103299481 | 9/2013 |

(Continued)

OTHER PUBLICATIONS

H. Yagi "Beam Transmission of Ultra Short Waves" Proceedings of the Institute of Radio Engineers ( vol. 16, Issue: 6, Jun. 1928) Abstract Only.

(Continued)

*Primary Examiner* — Dimary S Lopez Cruz
*Assistant Examiner* — Aladdin Abdulbaki
(74) *Attorney, Agent, or Firm* — ALLEN, DYER, DOPPELT, + GILCHRIST, P.A.

(57) ABSTRACT

A communications device may include an RF device, and an antenna coupled to the RF device. The RF device may have a conductive ground plane, a conductive support rod carried by the conductive ground plane and extending outwardly therefrom, and a conductive body coupled to and surrounding the conductive support rod. The conductive body may have a helical slot to define a helical slot radiating antenna.

20 Claims, 23 Drawing Sheets

(56) References Cited

U.S. PATENT DOCUMENTS

| | | | |
|---|---|---|---|
| 5,928,000 A | 7/1999 | Rudisill et al. | |
| 5,933,096 A | 8/1999 | Tsuda | |
| 6,094,178 A | 7/2000 | Sanford | |
| 6,320,552 B1 | 11/2001 | Volman et al. | |
| 6,344,834 B1 | 2/2002 | Josypenko | |
| 6,353,419 B1 | 3/2002 | Gates et al. | |
| 6,653,987 B1 | 11/2003 | Lamensdorf et al. | |
| 6,688,408 B2 | 2/2004 | Barbera et al. | |
| 6,689,125 B1 | 2/2004 | Keith et al. | |
| 6,765,541 B1 | 7/2004 | Josypenko | |
| 6,805,695 B2 | 10/2004 | Keith et al. | |
| 6,891,516 B1 | 5/2005 | Saunders et al. | |
| 6,897,822 B2 | 5/2005 | Sparks | |
| 6,912,287 B1 | 6/2005 | Fukumoto et al. | |
| 6,975,281 B2 | 12/2005 | Neel | |
| 7,038,636 B2 | 5/2006 | Larouche et al. | |
| 7,126,557 B2 | 10/2006 | Warnagiris | |
| 7,151,505 B2 | 12/2006 | Jostell et al. | |
| 7,158,093 B2 | 1/2007 | Yang et al. | |
| 7,158,819 B1 | 1/2007 | Pulimi et al. | |
| 7,183,998 B2 | 2/2007 | Wilhelm et al. | |
| 7,253,787 B2 | 8/2007 | Liu et al. | |
| 7,292,203 B2 | 11/2007 | Craggs et al. | |
| 7,427,962 B2 | 9/2008 | Yang | |
| 7,515,113 B2 | 4/2009 | Petros | |
| 7,536,020 B2 | 5/2009 | Fukumoto et al. | |
| 7,753,941 B2 | 7/2010 | Keith et al. | |
| 7,887,271 B2 | 2/2011 | Perkin et al. | |
| 7,905,923 B2 | 3/2011 | Keith et al. | |
| RE42,533 E | 7/2011 | Josypenko | |
| 8,022,890 B2 | 9/2011 | Bondyopadhyay | |
| 8,156,972 B2 | 4/2012 | Burns et al. | |
| 8,267,812 B1 | 9/2012 | Sery | |
| 8,314,750 B1 | 11/2012 | Josypenko | |
| 8,315,713 B2 | 11/2012 | Burnes et al. | |
| 8,436,784 B2 | 5/2013 | Jalali Mazlouman et al. | |
| 8,460,214 B2 | 6/2013 | Kuban et al. | |
| 8,525,751 B1 | 9/2013 | Josypenko | |
| 8,532,793 B2 | 9/2013 | Morris et al. | |
| 8,547,291 B1 | 10/2013 | Josypenko | |
| 8,617,153 B2 | 12/2013 | Lee et al. | |
| 8,777,939 B2 | 7/2014 | Lee et al. | |
| 8,786,503 B2 | 7/2014 | Apostolos et al. | |
| 8,800,111 B2 | 8/2014 | Haylock et al. | |
| 8,836,600 B2 | 9/2014 | Lafleur | |
| 8,847,832 B2 | 9/2014 | Parsche et al. | |
| 8,863,450 B2 | 10/2014 | Anderson et al. | |
| 8,915,268 B2 | 12/2014 | Burns et al. | |
| 8,974,316 B2 | 3/2015 | Sery | |
| D738,358 S | 9/2015 | Schmidt | |
| 9,209,521 B2 | 12/2015 | Hung et al. | |
| 9,214,734 B2 | 12/2015 | Huynh | |
| 9,220,562 B2 | 12/2015 | Brannan et al. | |
| 9,264,090 B2 | 2/2016 | Johnson et al. | |
| 9,287,614 B2 | 3/2016 | Vahidpour et al. | |
| D758,356 S | 6/2016 | Schmidt | |
| 9,358,066 B2 | 6/2016 | Brannan | |
| 9,362,972 B2 | 6/2016 | Johnson et al. | |
| 9,375,275 B2 | 6/2016 | Lee et al. | |
| 9,387,038 B2 | 7/2016 | Brannan et al. | |
| 9,553,360 B1 | 1/2017 | Huang et al. | |
| 9,561,369 B2 | 2/2017 | Burnes et al. | |
| 9,572,982 B2 | 2/2017 | Burnes et al. | |
| 9,680,224 B2 | 6/2017 | Parsche et al. | |
| 9,700,374 B2 | 7/2017 | Lee et al. | |
| 9,722,297 B2 | 8/2017 | Yung et al. | |
| 9,728,847 B2 | 8/2017 | Hung et al. | |
| 9,793,612 B1 * | 10/2017 | Siripuram | H01Q 9/28 |
| 9,899,746 B2 | 2/2018 | Grandfield et al. | |
| 9,960,494 B2 | 5/2018 | Tatarnikov | |
| 10,028,787 B2 | 7/2018 | Lee et al. | |
| 10,044,107 B2 | 8/2018 | Elliot et al. | |
| 10,079,433 B2 | 9/2018 | Ohgren et al. | |
| 10,165,630 B2 | 12/2018 | Okoniewski et al. | |
| 10,226,296 B2 | 3/2019 | Brannan et al. | |
| 10,314,652 B2 | 6/2019 | Brannan | |
| 10,321,956 B2 | 6/2019 | Brannan et al. | |
| 10,363,094 B2 | 7/2019 | Brannan et al. | |
| 10,381,737 B2 | 8/2019 | Tawk et al. | |
| 10,396,446 B2 | 8/2019 | Yoon et al. | |
| 10,424,836 B2 | 9/2019 | McMichael et al. | |
| 10,441,746 B2 | 10/2019 | Besselink | |
| 10,483,631 B2 | 11/2019 | McMichael et al. | |
| 10,511,099 B2 | 12/2019 | Klein | |
| 10,574,339 B2 | 2/2020 | Chandra et al. | |
| 10,627,198 B2 | 4/2020 | Rovinsky | |
| 10,765,348 B2 | 9/2020 | Antonio et al. | |
| 10,916,856 B1 | 2/2021 | Sayem et al. | |
| 10,931,019 B1 | 2/2021 | Kefauver et al. | |
| 11,187,507 B2 | 11/2021 | Rovinsky | |
| 11,217,882 B2 * | 1/2022 | Luo | H01Q 25/001 |
| 11,234,765 B2 | 2/2022 | Brannan et al. | |
| 11,241,557 B2 | 2/2022 | Besselink | |
| 2006/0050009 A1 | 3/2006 | Ho et al. | |
| 2010/0134378 A1 | 6/2010 | Duchesne et al. | |
| 2018/0205153 A1 * | 7/2018 | Georgakopoulos | H01Q 11/086 |
| 2019/0393610 A1 * | 12/2019 | Guthrie | H01Q 21/0043 |
| 2020/0038630 A1 | 2/2020 | Besselink | |
| 2020/0365979 A1 * | 11/2020 | Rodríguez | H01Q 1/243 |
| 2023/0344136 A1 | 10/2023 | Liu et al. | |

FOREIGN PATENT DOCUMENTS

| | | |
|---|---|---|
| CN | 104022360 | 9/2014 |
| CN | 206098687 | 4/2017 |
| DE | 1466271 | 1/1969 |
| DE | 2412139 | 9/1974 |
| DE | 2611380 | 9/1977 |

OTHER PUBLICATIONS

John D. Kraus "Antennas" McGraw Hill: 1st Edition: 1950 pgs. Abstract Only.

John Kraus, "Antennas" McGraw Hill 2nd Edition: copyright 1988, chapter 13, pp. 624-627 http://antena.fe.uni-lj.si/literatura/ar/Antennas_mcgraw-hill_2nd_ed_1988-john_d_kraus.pdf.

Ho et al. "A novel crank quadrifilar slot antenna for GPS hand-held receivers" 1998 IEEE-APS Conference on Antennas and Propagation for Wireless Communications; Abstract Only.

K.P. Ray "Research activities on antennas in SAMEER"2008 International Conference on Recent Advances in Microwave Theory and Applications: Abstract Only.

Lukin et al. "Synthetic aperture antenna for near field applications" Business; 4th International Conference on Antenna Theory and Techniques: Oct. 27, 2003 Abstract Only.

Hong et al. "Miniaturized circularly polarized microstrip antenna by spirally slotted" Business 2015 IEEE 4th Asia-Pacific Conference on Antennas and Propagation (APCAP): Jun. 1, 2015; Abstract Only.

Li et al. "A single-band and dual-band circular polarized antenna by using asymmetric-circular shaped slots" Conference: 2016 IEEE 5th Asia-Pacific Conference on Antennas and Propagation (APCAP): Jul. 2016; Abstract Only.

Yu et al. "Design of a slot-coupled radial line helical array antenna for high power microwave applications" AIP Advances 7, 095101 (2017); p. 11.

Lee et al. "Helical Slot Antenna for the Microwave Ablation" Business, Physics International Journal of Antennas and Propagation: Oct. 30, 2019; Abstract Only.

U.S. Appl. No. 18/048,070, filed Oct. 20, 2022 Francis Parsche.

U.S. Appl. No. 17/650,574, filed Feb. 10, 2022 Francis E. Parsche.

U.S. Appl. No. 17/447,830, filed Sep. 16, 2021 Francis E. Parsche.

Tutorialspoint.com "Antenna Theory—Helica" retrieved from internet Nov. 10, 2022 https://www.tutorialspoint.com/antenna_theory/antenna_theory_helical.htm; pp. 4.

R.K. Zimmerman "Traveling-wave analysis of a bifilar scanning helical antenna" IEEE Transactions on Antennas and Propagation ( vol. 48, Issue: 6, Jun. 2000) Abstract Only.

(56) References Cited

OTHER PUBLICATIONS

Ehrenspeck et al. "Two-dimensional End Fire Array With Increased Gain and Side lobe Reduction" Wescon/57 conference record, vol. 1, pp. 217-230.
W.W. Hansen, J.R. "A New Principle in Directional Antenna Design" Woodward, Proceedings of the Institute of Radio Engineers, 1938, vol. 26, issue 3 pp. 343-345.
John D. Kraus "Helical Beam Antennas for Wide-Band Applications" Proceedings of the Institute of Radio Engineers, 36, pp. 1236-1242, Oct. 1948.
Chen et al. "Transmission line analysis of the Archimedean spiral antenna in free space" Journal of Electromagnetic Waves and Applications, 28:10, 1175-1193, DOI: 10.1080/09205071.2014.909295 Abstract Only.

* cited by examiner

3400

| NAME | X | Y |
|---|---|---|
| M1 | 1.2333 | 12.9048 |
| M2 | 1.0333 | 10.7694 |
| M3 | 1.3667 | 11.1504 |
| M4 | 1.1000 | 12.7901 |
| M5 | 0.9333 | 9.7968 |
| M6 | 1.3000 | 9.8561 |
| M7 | 1.1333 | 12.8615 |
| M8 | 0.9508 | 9.7870 |
| M9 | 1.3047 | 9.8831 |

COMMUNICATIONS DEVICE WITH HELICAL SLOT RADIATING ANTENNA AND RELATED ANTENNA DEVICE AND METHOD

TECHNICAL FIELD

The present disclosure relates to the field of communications, and, more particularly, to a wireless communications device and related methods.

BACKGROUND

Space antenna assemblies for satellite-to-ground links typically require a single directive beam, high gain, low mass, and high reliability. Elongate antennas may sometimes be used as they increase gain for a given mounting space relative planar antennas. Circular polarization can be desirable for satellite-to-earth links as circular polarization mitigates against the Faraday rotation of waves passing through the ionosphere. Yagi-Uda antennas are an elongate antenna of high directivity for size that can provide circular polarization by a turnstile feature. ("Beam Transmission Of Short Waves", Proceedings of the Institute Of Radio Engineers, 1928, Volume 16, Issue 6, pages 715-740). In a turnstile antenna, two Yagi-Uda antennas are mounted at right angles to each other on a common boom, fed equal amplitude and phased at 0° and 90° degrees by a feeding network. Yagi-Uda antennas may be limited in bandwidth. While the Yagi-Uda director elements may usefully provide an artificial lens, the director elements are sharply tuned.

Although the field of antennas is approximately 130 years old, the antenna types and their design may remain artisan in nature. Radiation pattern requirements may not indicate all possible antenna shapes that are useful to meet the radiation requirement. For instance, Fourier Transform techniques may refer a radiation pattern shape to a planar antenna aperture current distribution yet the Fourier Transform may not easily define or devise an end fire antenna.

It seems there was a golden age in which many of the Euclidian geometries were implemented in metal and used as antennas with useful results. Examples may be the line based wire dipole, circular loop, conical horn, and parabolic reflector etc. The Euclidian shapes offer optimizations of shortest distance between two points for the line dipole and in turn perhaps maximum radiation resistance for length, most area enclosed for least circumference for circular loops and circular patches, and maximum directivity for aperture area.

Elongate antennas may be desirable for Earth satellites as planar broadside firing antennas may not fit within a limited satellite size and area. An elongate antenna of high directivity and gain is provided by a cascade of multiple dipoles known as the Yagi-Uda Antenna. ("Beam Transmission Of Short Waves", Proceedings of the Institute Of Radio Engineers, 1928, Volume 16, Issue 6, pages 715-740). This reference referred to the many directors as a "wave canal". Thus, an artificial lens was formed. A Yagi-Uda antenna is narrow in bandwidth, which limits its application, and the beam may be asymmetric.

In an existing approach, an antenna providing circular polarization is an axial mode wire helix antenna. An example is disclosed in "Helical Beam Antennas For Wide-Band Applications", John D. Kraus, Proceedings Of The Institute Of Radio Engineers, 36, pp 1236-1242, October 1948. In the book, "Antennas", McGraw Hill, 1st Edition, the same John D. Kraus describes seeing a wire helix used in a traveling wave tube. Given this, it was posited whether the helix would function as antenna. The resulting axial mode wire helix antenna was useful for forming directive beams with a helix diameter between about 0.8 and 1.3 wavelengths and a winding pitch angle of between 13° and 17°. Radiation is emitted in an end fire mode, for example, along the axis of the helix, and a directive single main beam is created. Potential drawbacks may exist for the simple axial mode wire helix: realized gain is nearly 3 dB less than a Yagi-Uda antenna of the same length; the driving point resistance of the helix is near 130 ohms not 50 ohms; metal supports for the helix conductor may be disabling; and a direct current ground is not provided to drain space charging.

An improvement to the wire axial mode helix is found in U.S. Pat. No. 5,892,480 to Killen, assigned to the present application's assignee. This approach for a directional antenna comprises a helix-shaped antenna. Although this antenna is directional, the gain and bandwidth performance may be less than desirable.

Referring briefly to FIGS. 1A-1B, another existing approach discloses a helix-shaped antenna 100. This antenna 100 includes a helix-shaped conductor 101, and a conductive plane 102 coupled to the helix-shaped conductor. Diagram 150 shows gain performance for the antenna 100. The provided gain has a non-flat profile, which is less desirable in radio design.

SUMMARY

Generally, a communications device includes a radio frequency (RF) device, and an antenna coupled to the RF device. The RF device comprises a conductive ground plane, a conductive support rod carried by the conductive ground plane and extending outwardly therefrom, and a conductive body coupled to and surrounding the conductive support rod. The conductive body has a helical slot therein to define a helical slot radiating antenna.

More specifically, the conductive ground plane may have a width greater than a diameter of the conductive body. The communications device may also include a first coaxial cable coupling the RF device and the antenna. The first coaxial cable may include an inner conductor and an outer conductor surrounding the inner conductor. The outer conductor may be coupled to the conductive ground plane, and the inner conductor may extend through the conductive ground plane and be coupled to a proximal end of the conductive body.

In some embodiments, the proximal end of the conductive body may define a first gap with adjacent portions of the conductive ground plane. The conductive ground plane may comprise a conductive tuning body extending upwardly to define a second gap with the proximal end of the conductive body. The second gap may be smaller than a width of the first gap.

Also, the antenna may comprise a conductive disc element coupled to a distal end of the conductive support rod. The communications device may further comprise a second coaxial cable coupling the RF device and the antenna. The second coaxial cable may be coupled to the conductive disc element.

The helical slot may have an increasing helical pitch in a direction extending from the conductive ground plane. The helical slot may have a varying diameter in a direction extending from the conductive ground plane. For example, the antenna may have an operating frequency; the helical slot may have a diameter between 0.9 and 1.3 wavelengths of the operating frequency; the conductive support rod may have a diameter between 0.2 and 0.4 wavelengths of the operating frequency; and a thickness of each turn of the helical slot may be between 0.1 and 0.3 wavelengths of the operating frequency.

Another aspect is directed to an antenna device for an RF device. The antenna device includes a conductive ground plane, a conductive support rod carried by the conductive ground plane and extending outwardly therefrom, and a conductive body coupled to and surrounding the conductive support rod. The conductive body has a helical slot therein to define a helical slot radiating antenna.

Yet another aspect is directed to a method for making an antenna for a communications device. The method includes forming a conductive body coupled to and surrounding a conductive support rod carried by a conductive ground plane and extending outwardly therefrom. The conductive body has a helical slot therein to define a helical slot radiating antenna.

DETAILED DESCRIPTION

Figure 1A:
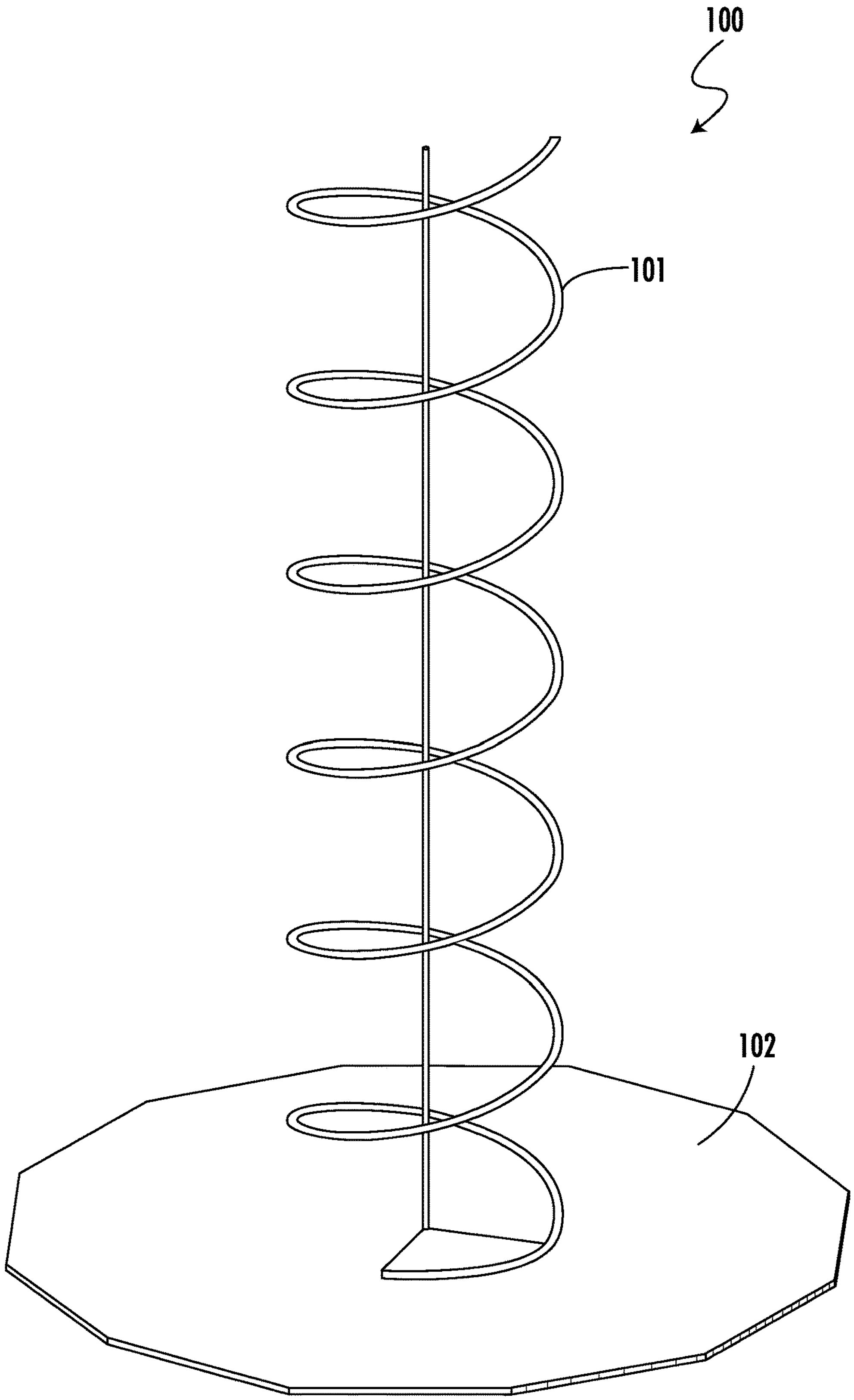
FIG. 1A (PRIOR ART)
FIG. 1A is a perspective view of an antenna, according to the prior art.
Figure 1B:
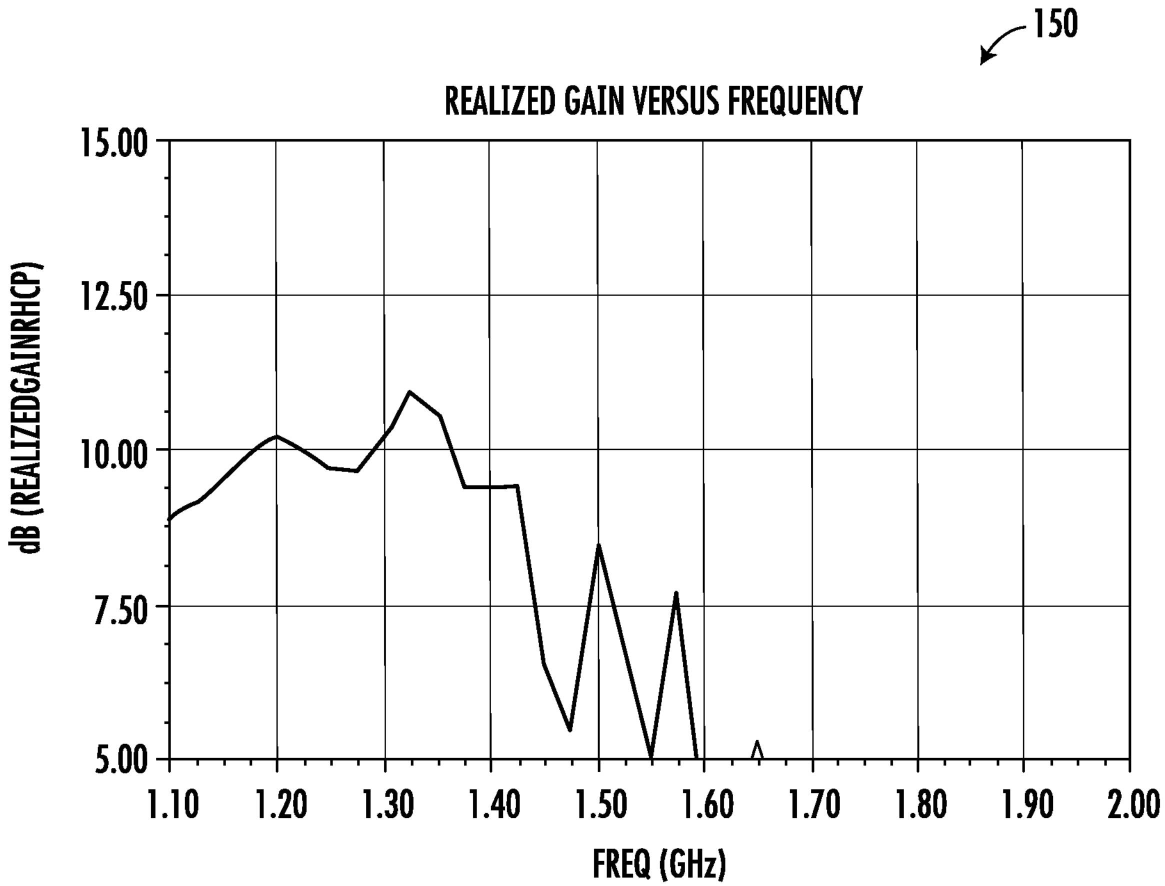
FIG. 1B (PRIOR ART)
FIG. 1B is a diagram of gain in the antenna of FIG. 1A.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Figure 2:
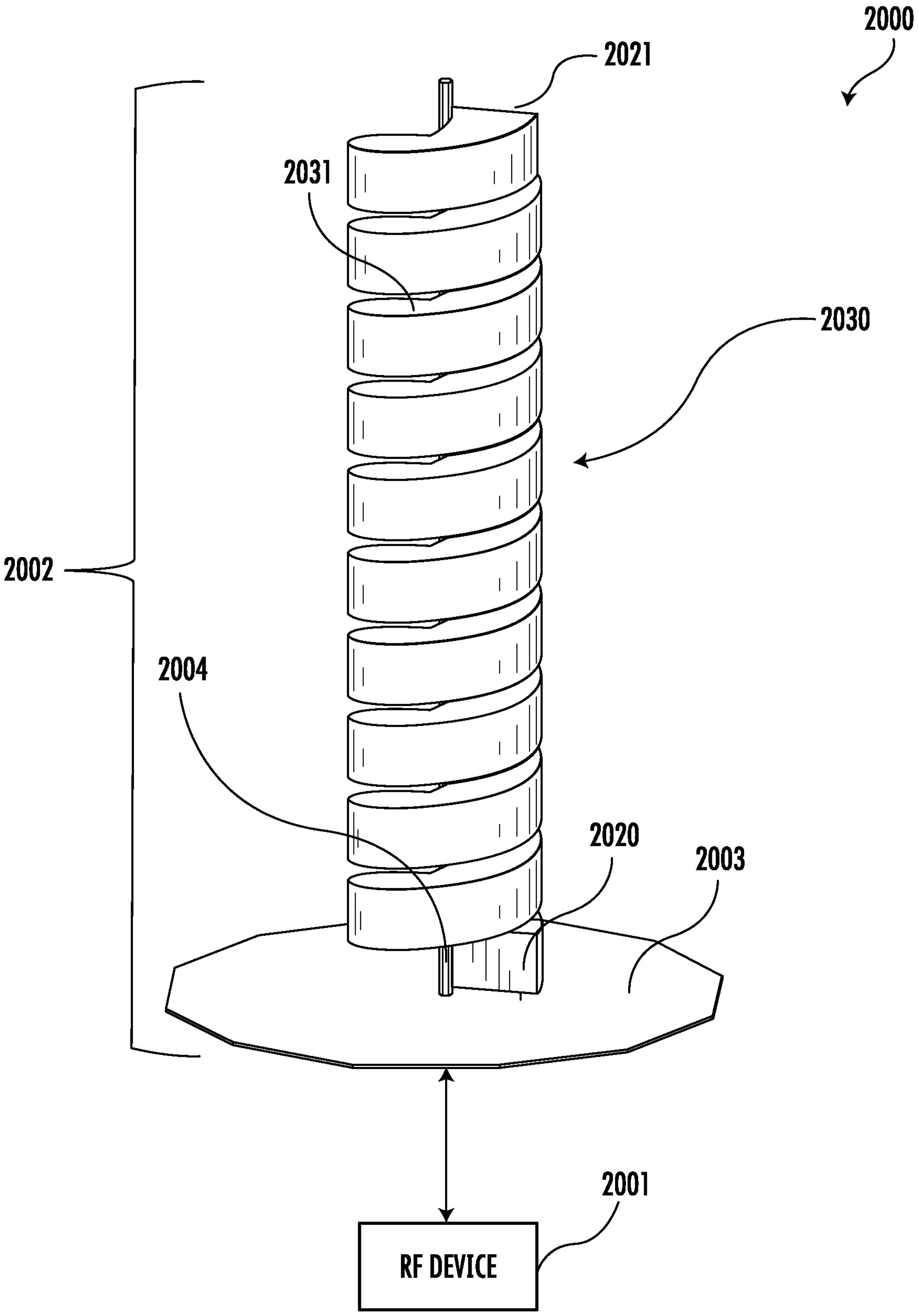
FIG. 2 is a perspective view of a communications device, according to a first example embodiment of the present disclosure.
Figure 3:
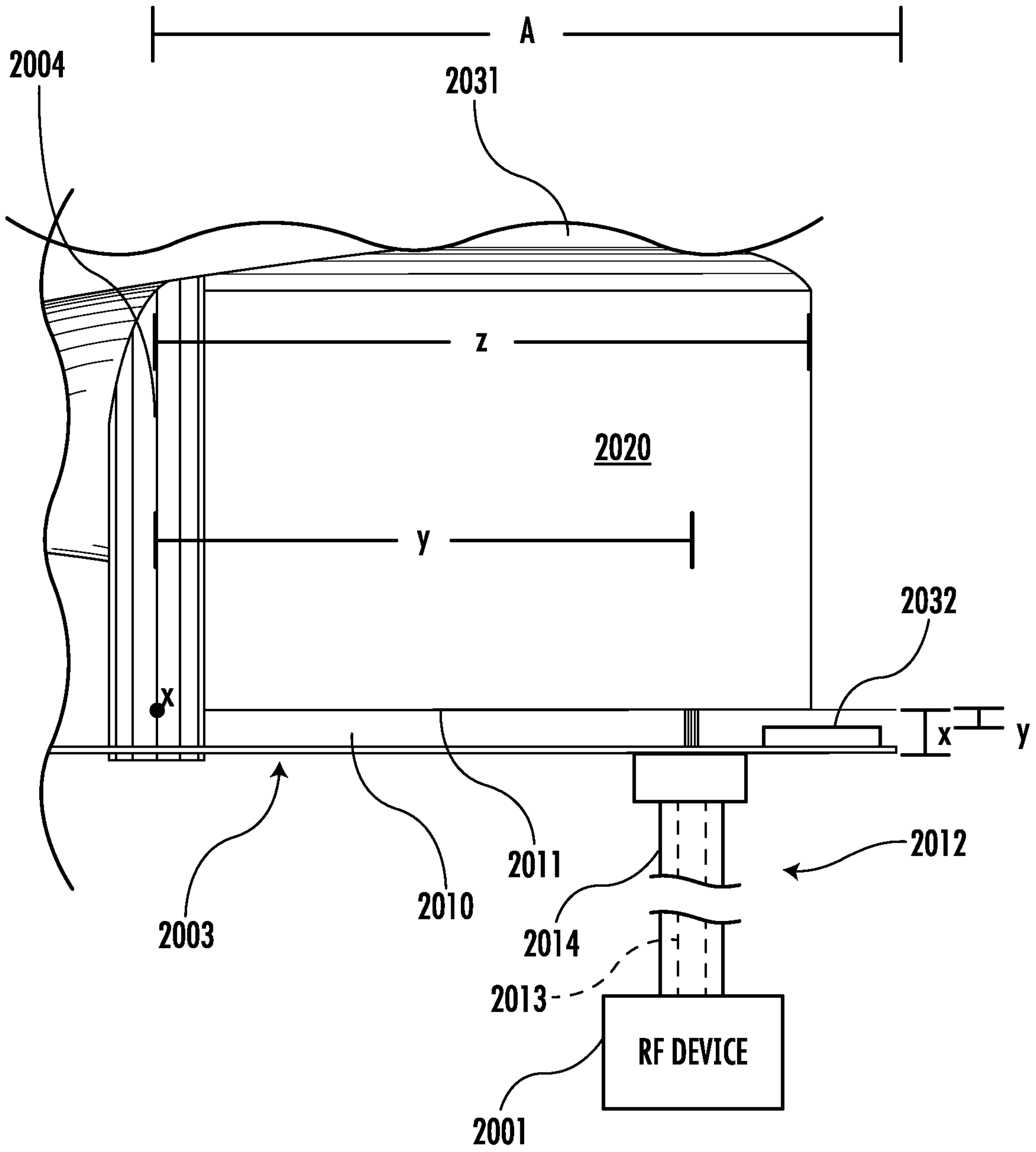
FIG. 3 is an enlarged side view of the communications device of FIG. 2.

In light of the existing antennas, there is an unsolved issue for providing a small, compact antenna that includes both high bandwidth and high directionality. Referring to FIGS. 2-3, a communications device 2000 according to the present disclosure is now described, which provides an approach to this issue. The communications device 2000 illustratively includes an RF device 2001 (e.g., RF transceiver, RF transmitter, or RF receiver), and an antenna 2002 coupled to the RF device. For example, the communications device 2000 may be deployed on-board a mobile platform, such as a vehicle or an aircraft. The antenna 2002 illustratively comprises a conductive ground plane 2003. In some applications, the communications device 2000 may comprise a LEO/MEO/high Earth orbit satellite communications device (i.e. either ground-to-space, space-to-ground, or space-to-space). In other applications, the communications device 2000 may be deployed in a point-to-point terrestrial network.

The communications device 2000 includes an RF device 2001, and an antenna 2002 coupled to the RF device. A transmission line may be present to convey RF energy between the antenna 2002 and the communications device 2000. A transmission line (e.g. illustrative RF coaxial cable) may be present to convey RF energy between the antenna 2002 and the communications device 2000. The antenna 2002 comprises a conductive ground plane 2003, a conductive support rod 2004 carried by the conductive ground plane and extending outwardly therefrom, and a conductive body 2030 coupled to and surrounding the conductive support rod. In some embodiments, the RF device 2001 includes an impedance compensation network to provide for increased bandwidth. In the illustrated embodiment, the conductive support rod 2004 is perpendicular to the conductive ground plane 2003, but may be canted in other embodiments.

The conductive ground plane 2003 illustratively comprises a conductive disc in shape, but the conductive plane may comprise other shapes in different embodiments, such as a cone shape. The conductive ground plane 2003 may also be used with choke rings and conical horn backings. In the illustrated embodiment, the conductive ground plane 2003 has a width greater than a diameter of the conductive body 2030. Further, the conductive ground plane 203 is illustratively planar and circle-shaped, but may take one other shapes, such as a planar/curved rectangle-shape or a planar/curved oval-shape. Indeed, in some vehicular applications, the ground metallic body of a vehicle may serve as the conductive ground plane 2003. In some embodiments, the conductive ground plane 2003 comprises a peripheral section having non-planar corrugations, which may provide radiation pattern shaping. The conductive ground plane 2003 may comprise one or more of aluminum, copper, silver, steel, and gold, for example. Indeed, any material of sufficient electrical conductivity can be used. Other antenna backings may be substituted for the conductive ground plane 2003, such as closed end cylindrical cups or hollow cones.

In some embodiments, the conductive support rod 2004 comprises only electrically conductive material, for example, copper, aluminum, or conductive polymer. In other embodiments, the conductive support rod 2004 may comprise a dielectric core, and an outer conductive layer (e.g. plating layer or coating layer) surrounding the dielectric core. In yet other embodiments, the conductive support rod 2004 may comprise a hollow core, and the outer conductive layer surrounds the hollow core.

The conductive body 2030 has a helical slot 2031 therein to define a helical slot radiating antenna. The helical slot radiating antenna may comprise a self-exciting antenna. As will be appreciated, this embodiment differs from the communications devices disclosed in U.S. patent application Ser. No. 17/650,574, "COMMUNICATIONS DEVICE WITH HELICALLY WOUND CONDUCTIVE STRIP WITH LENS AND RELATED ANTENNA DEVICE AND METHOD", in that the defined slots have an axial thickness less than the axial thickness of the turns of the conductive body 2030. In the antenna art, there is a distinction between conductive objects in an insulative space and nonconductive voids in a conductive space (e.g., the panel and slot antenna forms; and see "Antennas", John Kraus, 2nd Edition, copyright 1988, chapter 13, pages 624-627). The helical slot 2031 may be the dual to the helical wire antenna. The helical slot 2031 is a void in space where the helical wire configures an electrical conductor. Slot antennas, such as the helical slot 2031, may convey advantages, such as increased mechanical strength, DC grounding, increased directivity and gain, and improved manufacturability. The antenna formed by the helical slot 2031 in the conductivity body 2030 does not require an insulative structural form as the does the wire helix. Insulative forms may be undesirable in space and for ultraviolet radiation.

The communications device 2000 illustratively includes a first coaxial cable 2012 coupling the RF device 2001 and the antenna 2002. The first coaxial cable 2012 comprises an inner conductor 2013 and an outer conductor 2014 surrounding the inner conductor. The outer conductor 2014 is coupled to the conductive ground plane 2003, and the inner conductor 2013 extends through the conductive ground plane and is coupled to a proximal end 2020 of the conductive body 2030. The proximal end 2020 of the conductive body 2030 is adjacent the conductive ground plane 2003, and the conductive body also includes a distal end 2021 opposite the proximal end.

The inner conductor 2013 is coupled to the proximal end 2020 of the conductive body 2030 using a threaded fastener. In an exemplary embodiment, a ring style terminal lug is coupled to the inner conductor 2013, and a threaded screw is fastened through the ring style terminal lug and into the proximal end of the conductive body 2030.

In the illustrated embodiment, the proximal end 2020 of the conductive body 2030 defines a first gap x with adjacent portions of the conductive ground plane 2003. The conductive ground plane 2003 illustratively comprises a conductive tuning body 2032 extending upwardly to define a second gap y with the proximal end 2020 of the conductive body 2030. The second gap y is smaller than the first gap x. The conductive tuning body 2032 may provide for a parallel capacitance and provide for tuning of the antenna 2002.

The operational characteristics of the communications device 2000 are set by the physical dimensions of a gap 2010 between a longitudinal edge 2011 of the conductive body 2030 and the conductive ground plane 2003. In particular, the input resistance of the communications device 2000 is determined by x (gap 2010), the distance between the longitudinal edge 2011 and the conductive ground plane 2003, and y, the radial distance between the conductive support rod 2004 and the inner conductor 2013. A smaller value of x will bring the driving resistance to a lower value, and a higher value of x will provide a higher driving resistance. The tuned frequency is set by z, a radial distance between the conductive support rod 2004 and an outer radial edge of the longitudinal edge 2011. The back lobe of the antenna 2002 is set by A, a radial distance between the conductive support rod 2004 and an outer radial edge of the conductive ground plane 2003.

The conductive support rod 2004 may provide for a robust DC element ground and structural support. Helpfully, the antenna 2002 does not include any structural insulators (i.e. it is air gap insulated without, e.g., dielectric foam).

For example, the antenna 2002 may have an operating frequency (e.g. 1250 to 2200 MHz); the helical slot 2031 may have a diameter between 0.9 and 1.3 wavelengths of the operating frequency; the conductive support rod 2004 may have a diameter between 0.2 and 0.4 wavelengths of the operating frequency; and a thickness of each turn of the helical slot 2031 may be between 0.1 and 0.3 wavelengths of the operating frequency.

In some embodiments, the last turn of the conductive body 2030 has a diameter less than the rest of the conductive body. The reduced diameter may improve wave release without standing wave formation for the antenna 2002. Also, the conductive body 2030 may include a plurality of radial slots for impedance matching.

Another aspect is directed to an antenna device 2002 for an RF device 2001. The antenna device 2002 includes a conductive ground plane 2003, a conductive support rod 2004 carried by the conductive ground plane and extending outwardly therefrom, and a conductive body 2030 coupled to and surrounding the conductive support rod. The conductive body 2030 has a helical slot 2031 therein to define a helical slot radiating antenna.

Yet another aspect is directed to a method for making an antenna 2002 for a communications device 2000. The method includes forming a conductive body 2030 coupled to and surrounding a conductive support rod 2004 carried by a conductive ground plane 2003 and extending outwardly therefrom. The conductive body 2030 has a helical slot 2031 therein to define a helical slot radiating antenna.

In some embodiments, the forming of the conductive support rod 2004 and the forming of the conductive body 2030 comprises a single step of machining a billet of conductive material, for example, aluminum or copper. In other embodiments, the forming of the conductive support rod 2004 and the forming of the conductive body 2030 comprise one or more steps of additive manufacturing.

Figure 4:
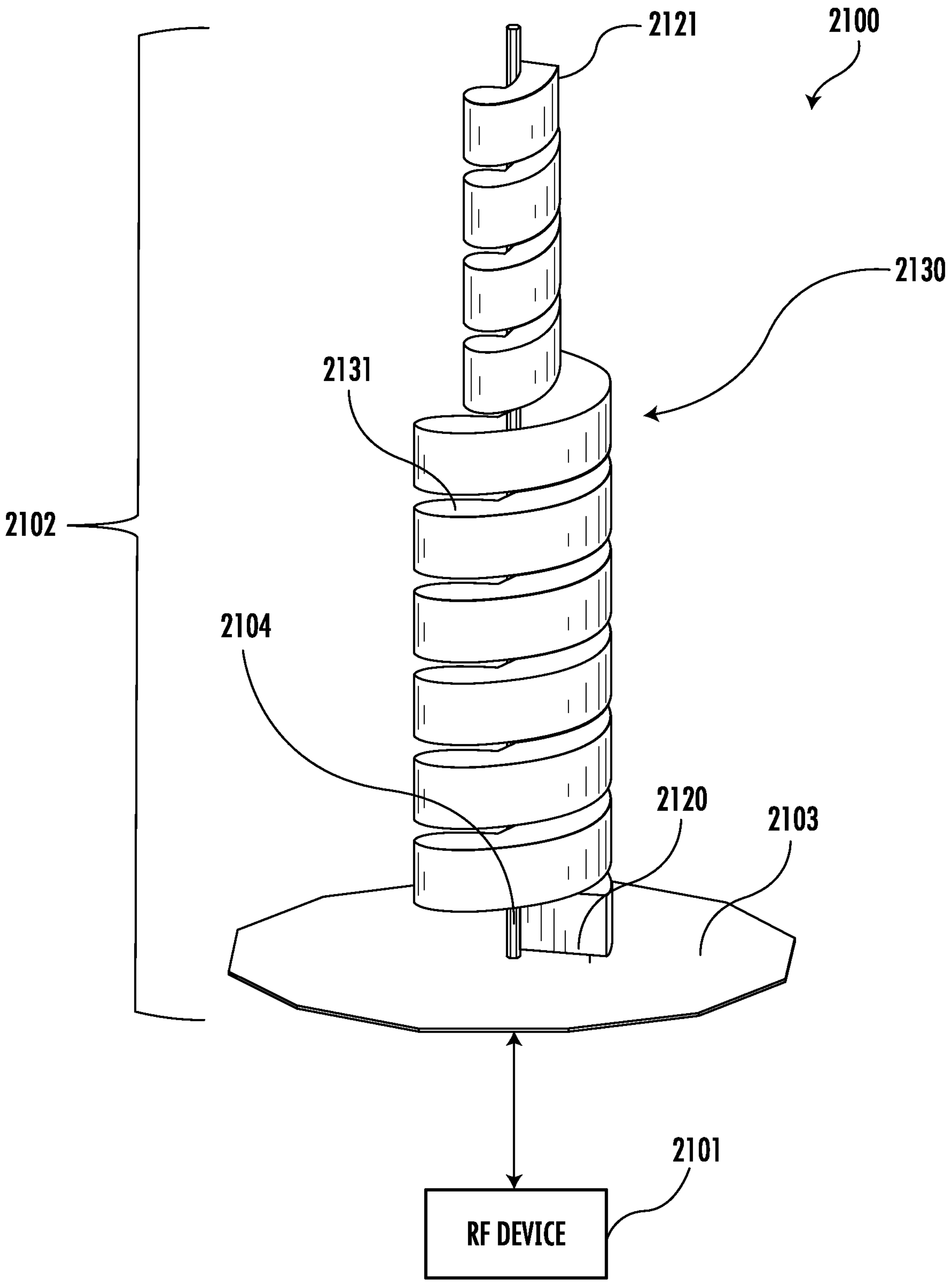
FIG. 4 is a perspective view of a communications device, according to a second example embodiment of the present disclosure.

Referring now additionally to FIG. 4, another embodiment of the communications device 2100 is now described. In this embodiment of the communications device 2100, those elements already discussed above with respect to FIGS. 2-3 are incremented by 100 and most require no further discussion herein. The communications device 2100 differs in that the conductive body 2130 and the helical slot 2131 each have a varying diameter in a direction extending from the conductive ground plane 2103. In particular, the helical slot 2131 has a decreasing diameter in the direction extending from the conductive ground plane 2103. This embodiment may provide for a lower axial ratio.

Of course, in other embodiments, the diameter may vary continuously, thereby forming a cone shaped helical slot or a logarithmic taper for multioctave bandwidth. In yet other embodiments, the helical slot 2131 may have an increasing diameter in the direction extending from the conductive ground plane 2103.

Figure 5:
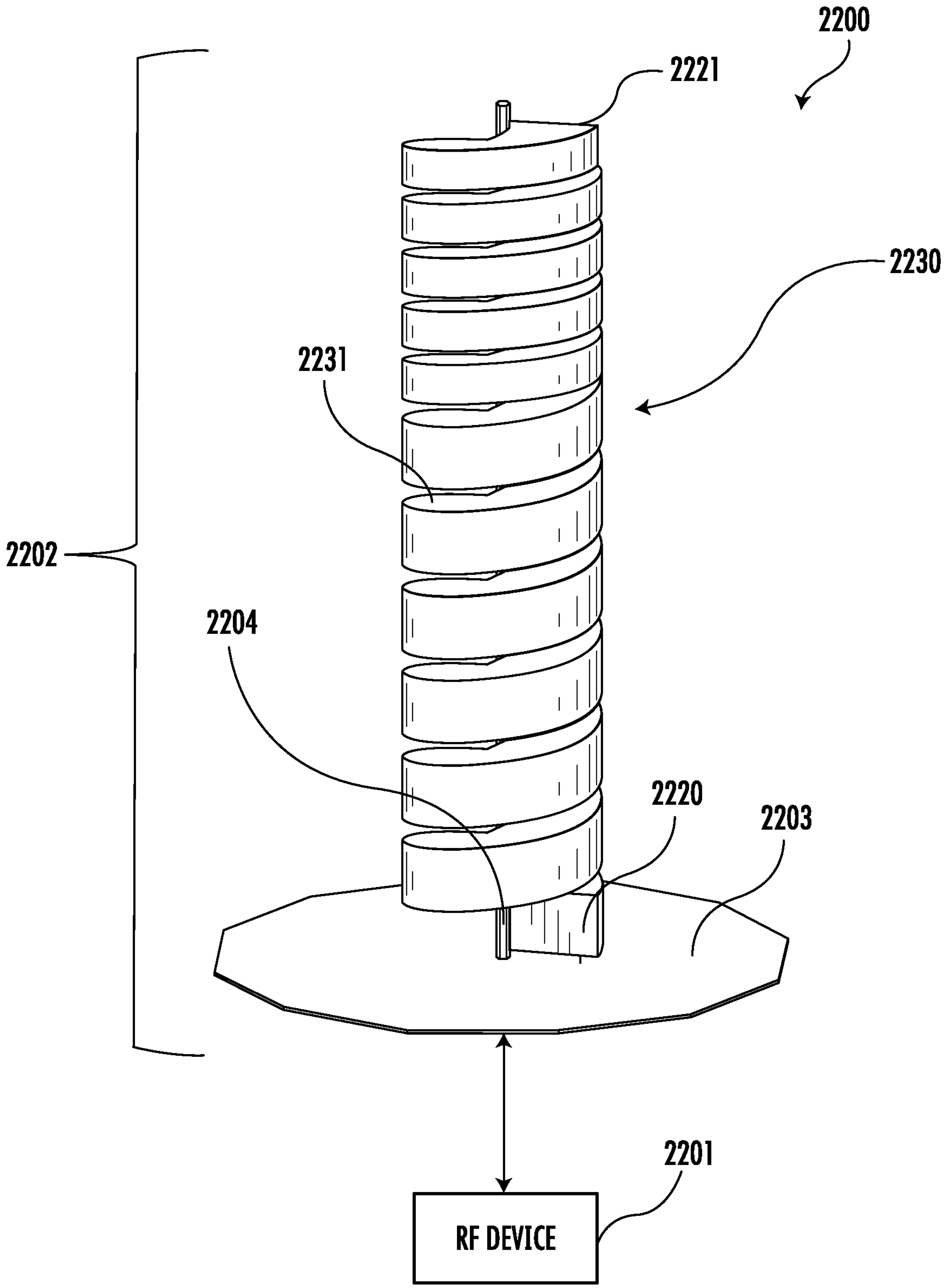
FIG. 5 is a perspective view of a communications device, according to a third example embodiment of the present disclosure.

Referring now additionally to FIG. 5, another embodiment of the communications device 2200 is now described. In this embodiment of the communications device 2200, those elements already discussed above with respect to FIGS. 2-3 are incremented by 200 and most require no further discussion herein. The communications device 2200 differs in that the conductive body 2230 has a helical slot 2231 having an increasing helical pitch in a direction extending from the conductive ground plane 2203.

Of course, in other embodiments, the helical pitch may decrease in the direction extending from the conductive ground plane 2203. In other words, the helical pitch would be tighter near the conductive ground plane 2203, which provides for more directivity.

Figure 6:
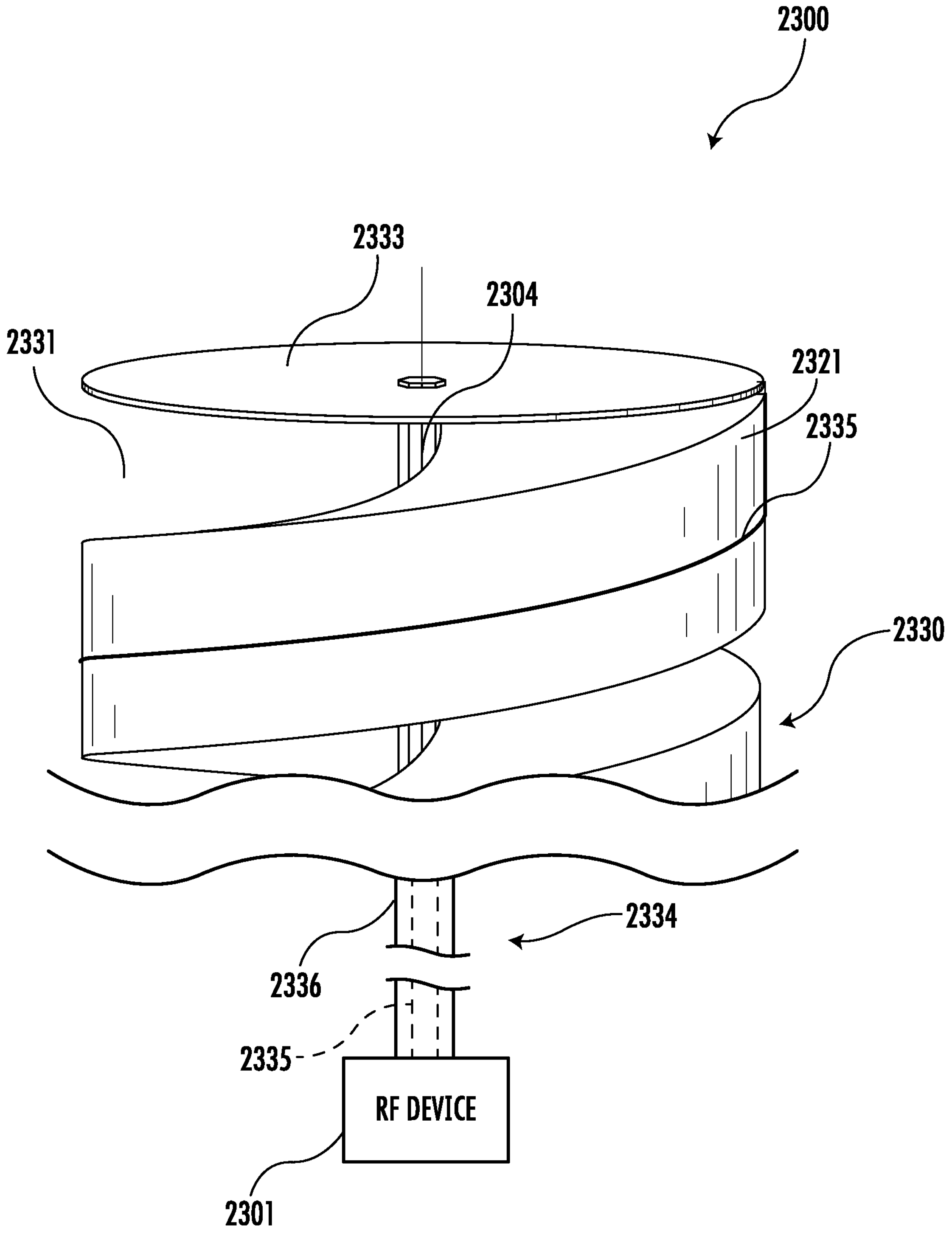
FIG. 6 is a partial perspective view of a communications device, according to a fourth example embodiment of the present disclosure.
Figure 7:
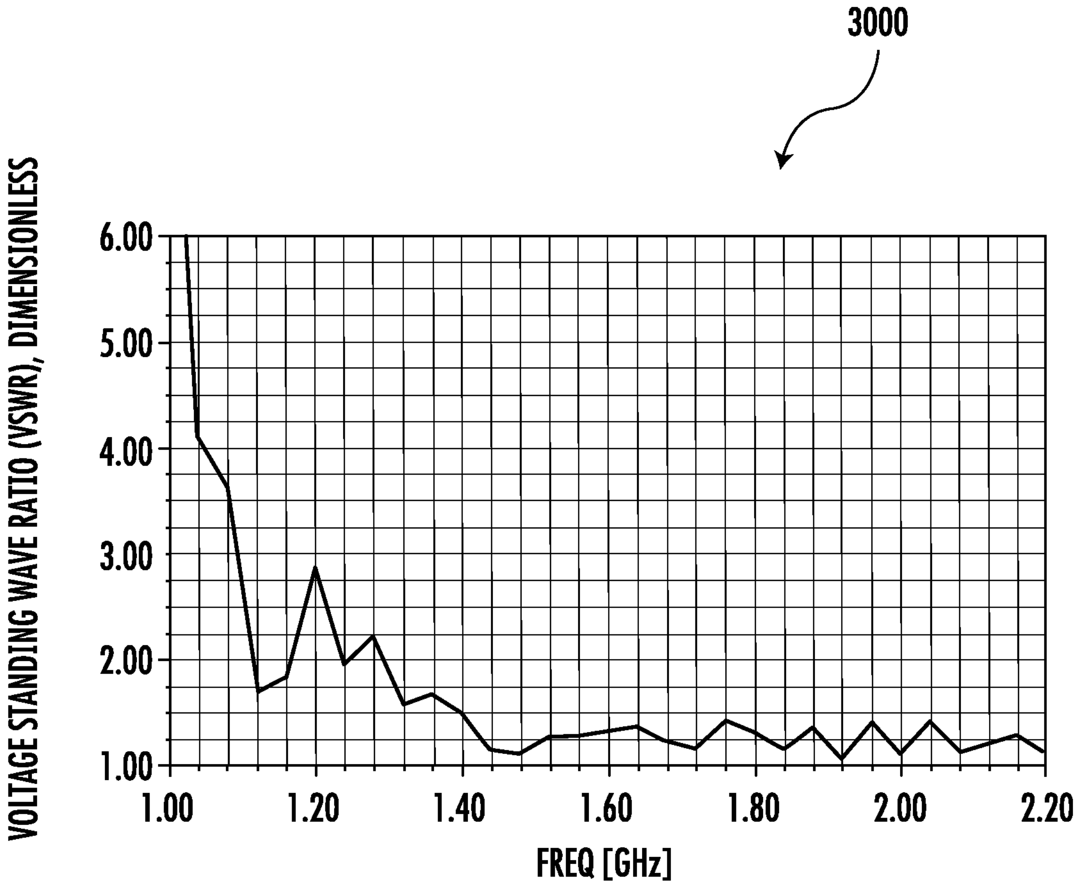
FIG. 7 is a diagram for VSWR in the communications device of FIG. 2.
Figure 8:
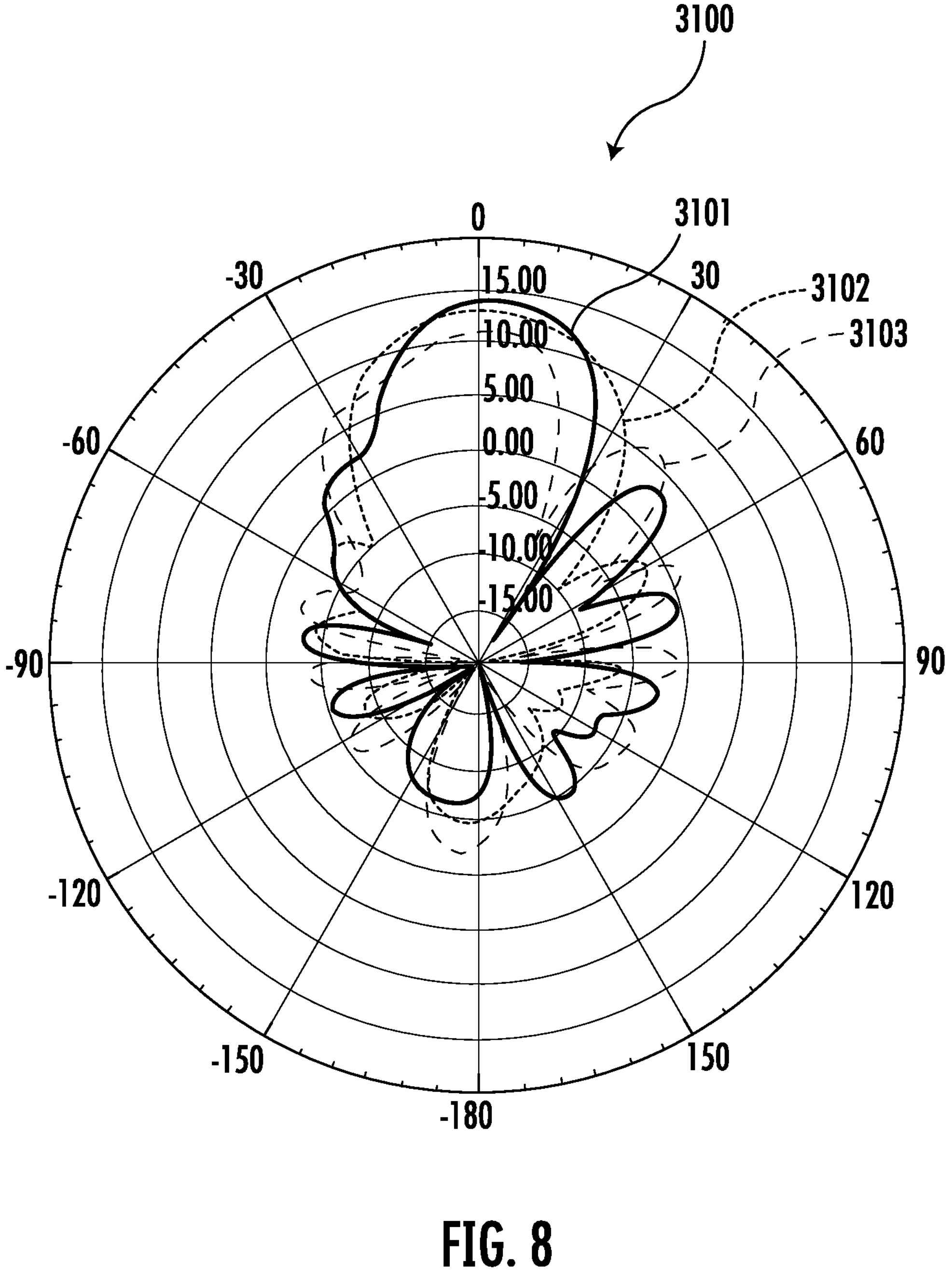
FIG. 8 is a diagram of a radiation pattern in the antenna of FIG. 2.
Figure 9:
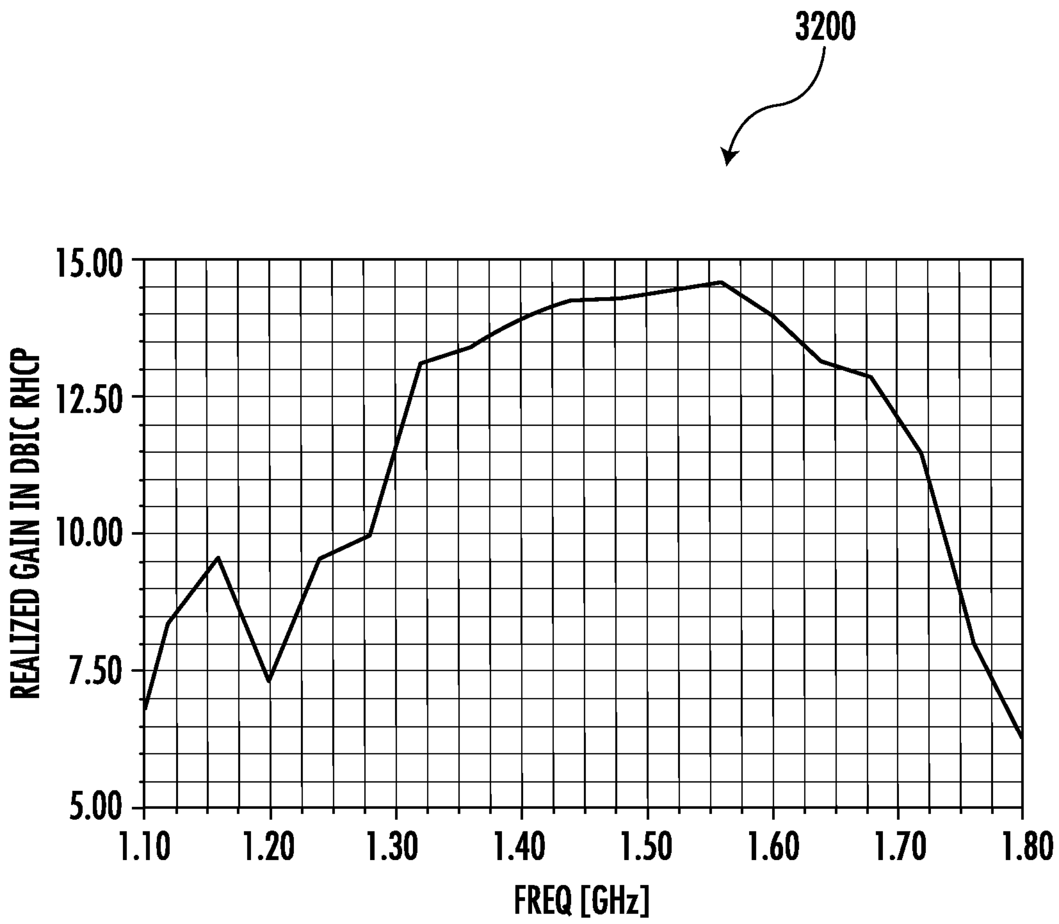
FIG. 9 is a diagram for gain in the communications device of FIG. 2.
Figure 10:
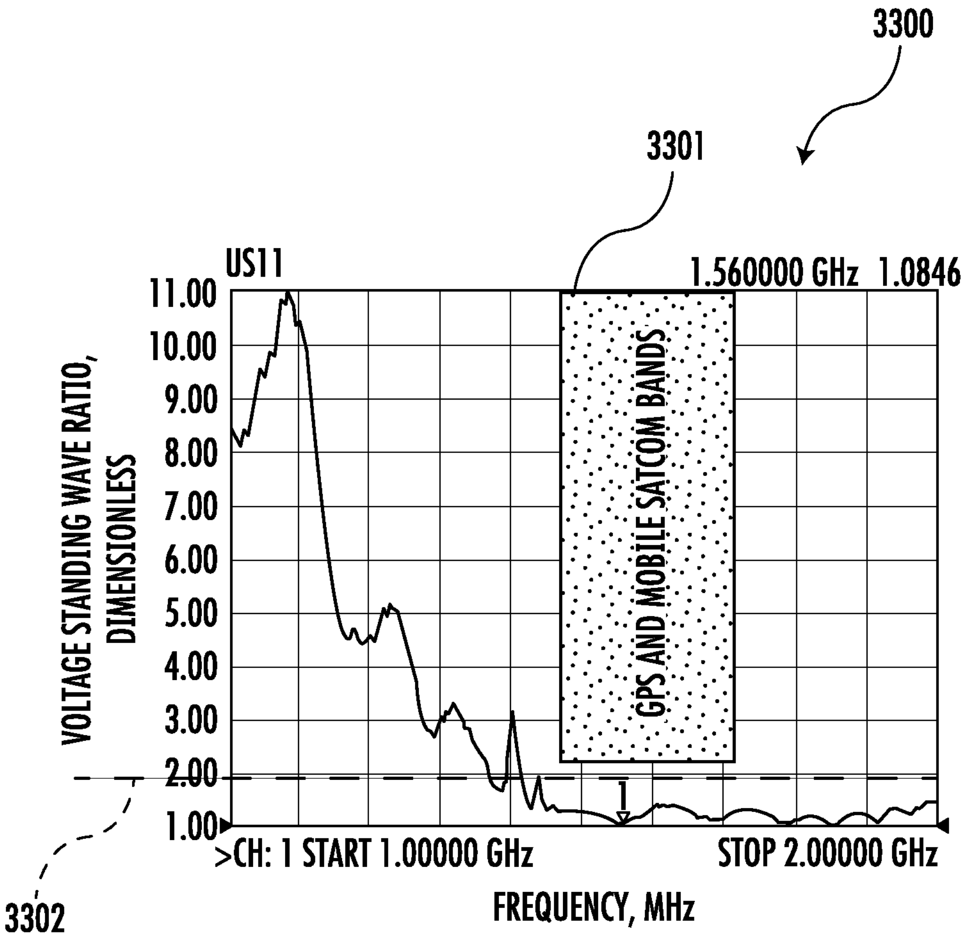
FIG. 10 is a diagram for VSWR in the communications device of FIG. 2.
Figure 11:
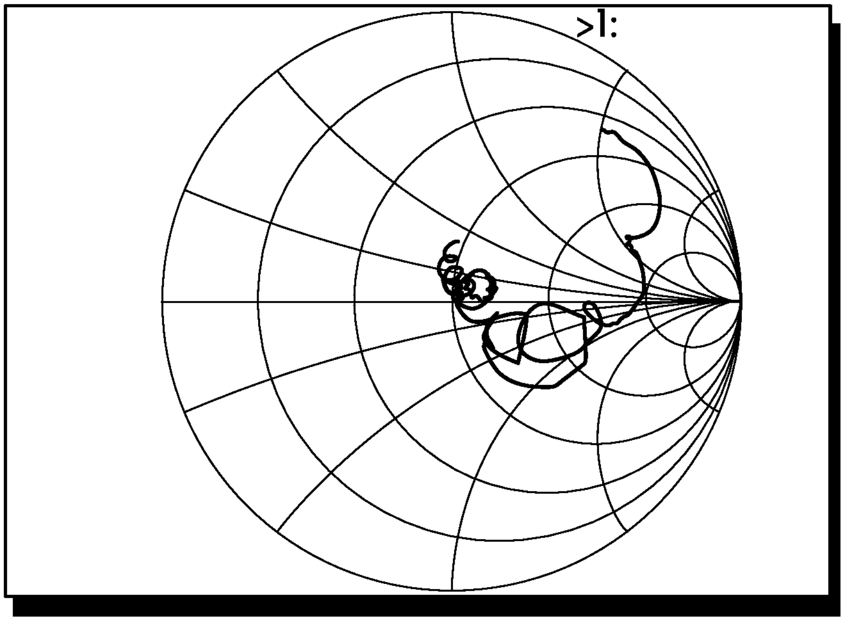
FIG. 11 is a diagram of a Smith chart of the communications device of FIG. 2.
Figure 12:
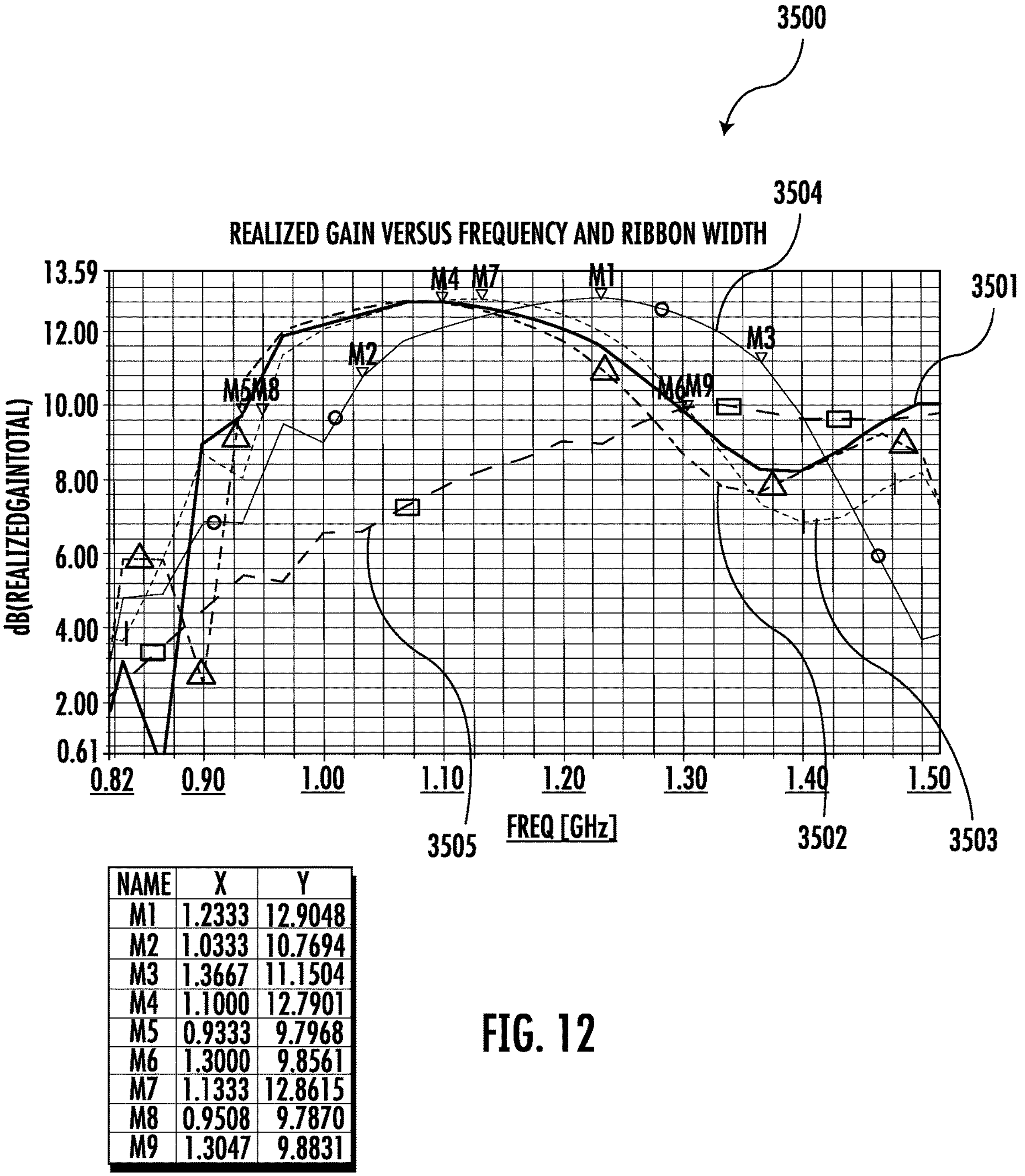
FIG. 12 is a diagram for gain in the communications device of FIG. 2 with varying slot width.

Referring now additionally to FIG. 6, another embodiment of the communications device 2300 is now described. In this embodiment of the communications device 2300, those elements already discussed above with respect to FIGS. 2-3 are incremented by 300 and most require no further discussion herein. The communications device 2300 differs in that the antenna 2302 comprises a conductive disc element 2333 coupled to a distal end 2321 of the conductive support rod 2304. The communications device 2300 further comprises a second coaxial cable 2334 coupling the RF device 2301 and the antenna 2302. The second coaxial cable 2334 is coupled to the conductive disc element 2333. In particular, the second coaxial cable 2334 comprises an inner conductor 2335, and an outer conductor 2336 surrounding the inner conductor. The inner conductor 2335 helically wraps around the conductive body 2330 and is coupled to the conductive disc element 2333.

Here, the communications device 2300 may provide for a dual sense circular polarization operational mode. For dual polarization, the first coaxial cable 2012 (FIG. 3) is for the first polarization sense, and the second coaxial cable 2334 is for the second polarization sense.

Referring now additionally to FIGS. 7-12, the performance characteristics of the communications device 2000 is now described. Diagram 3000 shows VSWR for the communications device 2000. Helpfully, the VSWR remains between 2 and 1 between 1250 to 2200 MHz.

Diagram 3100 shows an elevation cut radiation pattern for the antenna 2002. Helpfully, the radiation pattern is quite directional. The solid black trace 3101 shows realized gain at 1580 MHz. The short dash trace 3102 shows realized gain at a frequency of 1320 MHz. The long dash trace 3103 shows realized gain at a frequency of 1720 MHz. The directive beam includes 36° 3 dB beamwidth, and 14.6 dBic gain. Helpfully, this performance may surpass thresholds for satellites systems, for example, the Navigation Technology Satellite 3 and the Korea Positioning System. Also, the diagram 3100 shows a rippled radiation lobe, a shallow null at the boresight, and steeper radiation pattern beam skirts. Diagram 3200 shows gain for the communications device 2000. Advantageously, the gain is +14.6 dBic at 1560 MHz.

Diagram 3300 shows VSWR for the communications device 2000. The 2:1 VSWR requirement is shown by trace 3302. Helpfully, the VSWR remains between 2 and 1 within the GPS and mobile satellite communication bands (below the requirement), noted with the dot hatched box 3301. Diagram 3400 provides a vector impedance diagram or Smith chart for the antenna 2002.

Diagram 3500 shows gain for the communications device 2000. The regular line trace 3501 shows a sweep with θ=0°, slot width=0.05 inches, and Φ=0°, providing a 39% 3 dB gain in beamwidth. The triangle hatched line trace 3502 shows a sweep with θ=0°, slot width=0.4 inches, and Φ=0°. The dash hatched line trace 3503 shows a sweep with θ=0°, slot width=0.75 inches, and Φ=0°, providing a 35% 3 dB gain in beamwidth. The circle hatched line trace 3504 shows a sweep with θ=0°, slot width=1.1 inches, and Φ=0°, providing a 32% 3 dB gain in beamwidth. The rectangle hatched line trace 3505 shows a sweep with θ=0°, slot width=1.45 inches, and Φ=0°. Here, θ represents an angle between the conductive support rod 2004 and conductive ground plane 2003 (illustratively 90°), and Φ represents a rotational angle of the conductive support rod about the conductive ground plane.

In the following, the theory of operation for the antenna 2002 is provided. The conductive body 2030 may be considered a series fed array of individual single turn slot antennas comprising a slot form of the helix. Given that it is an end fire antenna, additionally the conductive body 2030 functions as a surface wave lens to guide waves launched from turns below. So, there is a compound operating mechanism including both transducing the wave and guiding the wave in lens fashion. The gap 2010 provides an electrical drive discontinuity for the sourcing of electrical current onto the antenna 2002 from inner conductor 2013. Moving the location of the coaxial connector 2012 adjusts the driving resistance of the antenna 2002. In FIG. 3, the dimension y increases driving resistance and a smaller dimension y reduces driving resistance. For example, the driving resistance of 50 ohms has been readily obtained as have other values. A variable winding pitch for the conductive body 2030 increases directivity by reducing side lobe energy relative to a fixed winding pitch for the conductive body 2030. The active mechanism is adjustment of wave velocity along the conductive body 2030. The wave may speed up as it is launched off the conductive body 2030.

Advantageously, the communications devices 2000, 2100, 2200, 2300 may provide for a smaller and lighter satellite antenna with increased bandwidth. Also, the communications devices 2000, 2100, 2200, 2300 may be manufactured with reduced cost as compared to existing approaches. As will be appreciated, the communications devices 2000, 2100, 2200, 2300 may provide for end firing antennas.

Referring now additionally to FIGS. 13-16, another embodiment of the communications device 2400 is now described. In this embodiment of the communications device 2400, those elements already discussed above with respect to FIGS. 2-3 are incremented by 400 and most require no further discussion herein. The communications device 2400 illustratively includes an RF device 2401, and an antenna 2402 coupled to the RF device. The communications device 2400 may provide similar performance to the communications devices 2000, 2100, 2200, 2300 discussed herein above.

The antenna 2402 illustratively comprises a conductive ground plane 2403. The conductive ground plane 2403 is illustratively circle-shaped, but may have other shapes in other embodiments. In some embodiments, the conductive ground plane 2403 may have a polygonal shape. In some embodiments, the conductive ground plane 2403 comprises a peripheral section having non-planar corrugations, which may provide radiation pattern shaping. The conductive ground plane 2403 may comprise one or more of aluminum, copper, silver, steel, and gold, for example. Indeed, any material of sufficient electrical conductivity can be used. Other antenna backings may be substituted for the conductive ground plane 2403, such as closed end cylindrical cups or hollow cones.

The antenna illustratively includes a conductive support rod 2404 carried by the conductive ground plane 2403 and extending outwardly therefrom. In particular, the conductive support rod 2404 extends substantially perpendicular to the conductive ground plane 2403 (i.e. ±° 10 of 90°). In some embodiments, the conductive support rod 2404 comprises only electrically conductive material, for example, copper, aluminum, or conductive polymer. In other embodiments, the conductive support rod 2404 may comprise a dielectric core, and an outer conductive layer (e.g. plating layer or coating layer) surrounding the dielectric core. In yet other embodiments, the conductive support rod 2404 may comprise a hollow core, and the outer conductive layer surrounds the hollow core.

The antenna 2402 illustratively comprises a conductive body 2430 coupled to and surrounding the conductive support rod 2404. The conductive body 2430 may comprise one or more of aluminum, copper, silver, steel, and gold, for example. The conductive body 2430 illustratively comprises a plurality of vertically spaced rhombus shaped slots 2440*a*-2440*i* therein to define a radiating antenna. The plurality of vertically spaced rhombus shaped slots 2440*a*-2440*i* is illustratively aligned in a vertical direction. In particular, the plurality of vertically spaced rhombus shaped slots 2440*a*-2440*i* is vertically aligned along a same vertical axis 2441. In particular, each of the plurality of vertically spaced rhombus shaped slots 2440*a*-2440*i* is bisected by a vertical axis 2441. In other embodiments, the plurality of vertically spaced rhombus shaped slots 2440*a*-2440*i* may be vertically offset.

Figure 13:
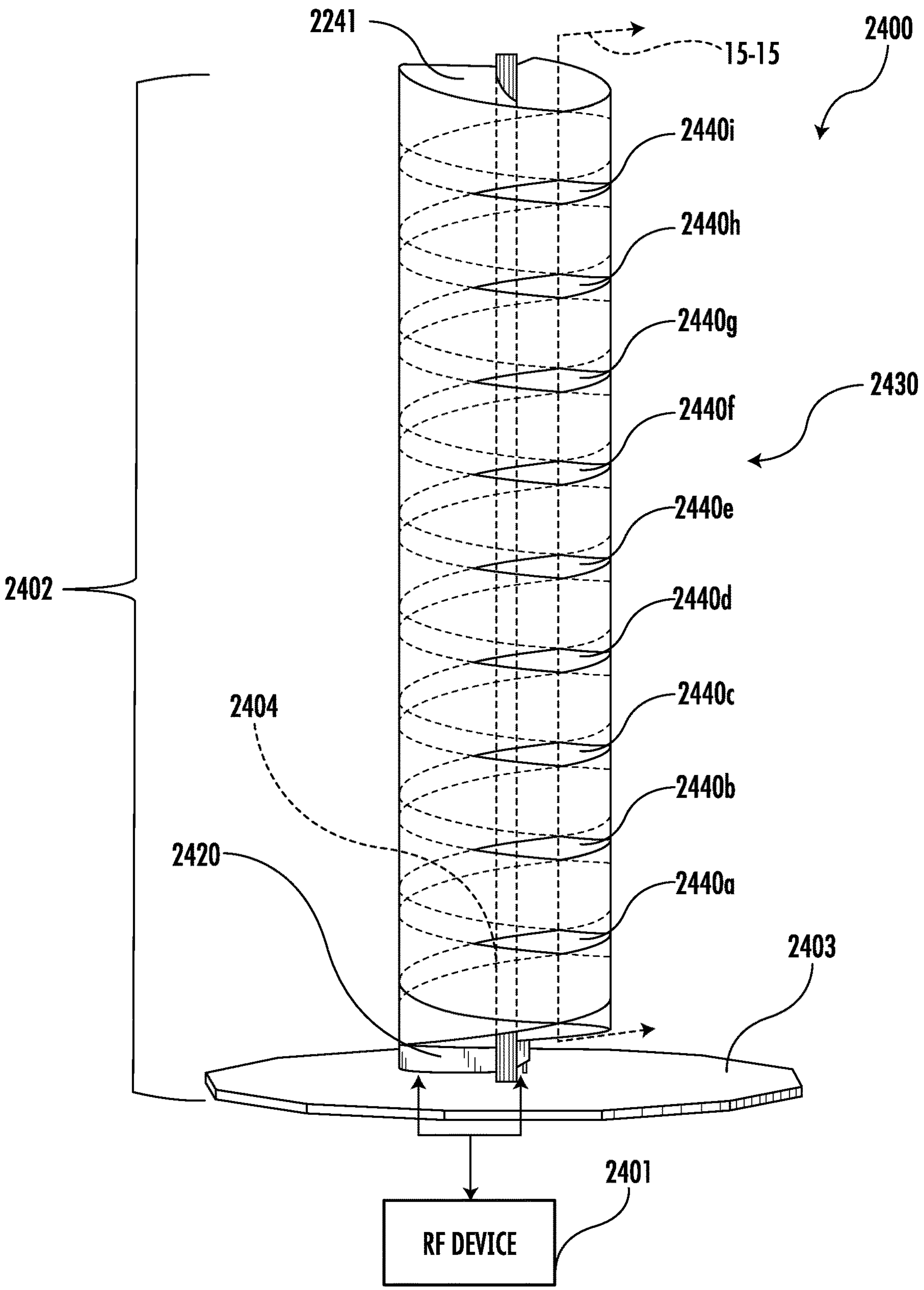
FIG. 13 is a perspective view of a communications device, according to a fifth example embodiment of the present disclosure.

Although not visible in FIG. 13, the conductive body 2430 illustratively comprises another set of vertically spaced rhombus shaped slots 2444 opposite to the plurality of vertically spaced rhombus shaped slots 2440*a*-2440*i*. In this example embodiment and as perhaps best seen in FIG. 15, the other set of vertically spaced rhombus shaped slots 2444 is laterally offset to the plurality of vertically spaced rhombus shaped slots 2440*a*-2440*i*.

In some embodiments, the conductive body 2430 and the conductive support rod 2404 are integrally formed. For example, the conductive body 2430 and the conductive support rod 2404 may be machined from a solid ingot of conductive material, or formed from an additive manufacturing process. In the illustrated embodiment, the conductive body 2430 is cylinder shaped. In some embodiments, the width of the conductive body 2430 may reduce linearly between the proximal end 2420 and the distal end 2421.

Figure 18:
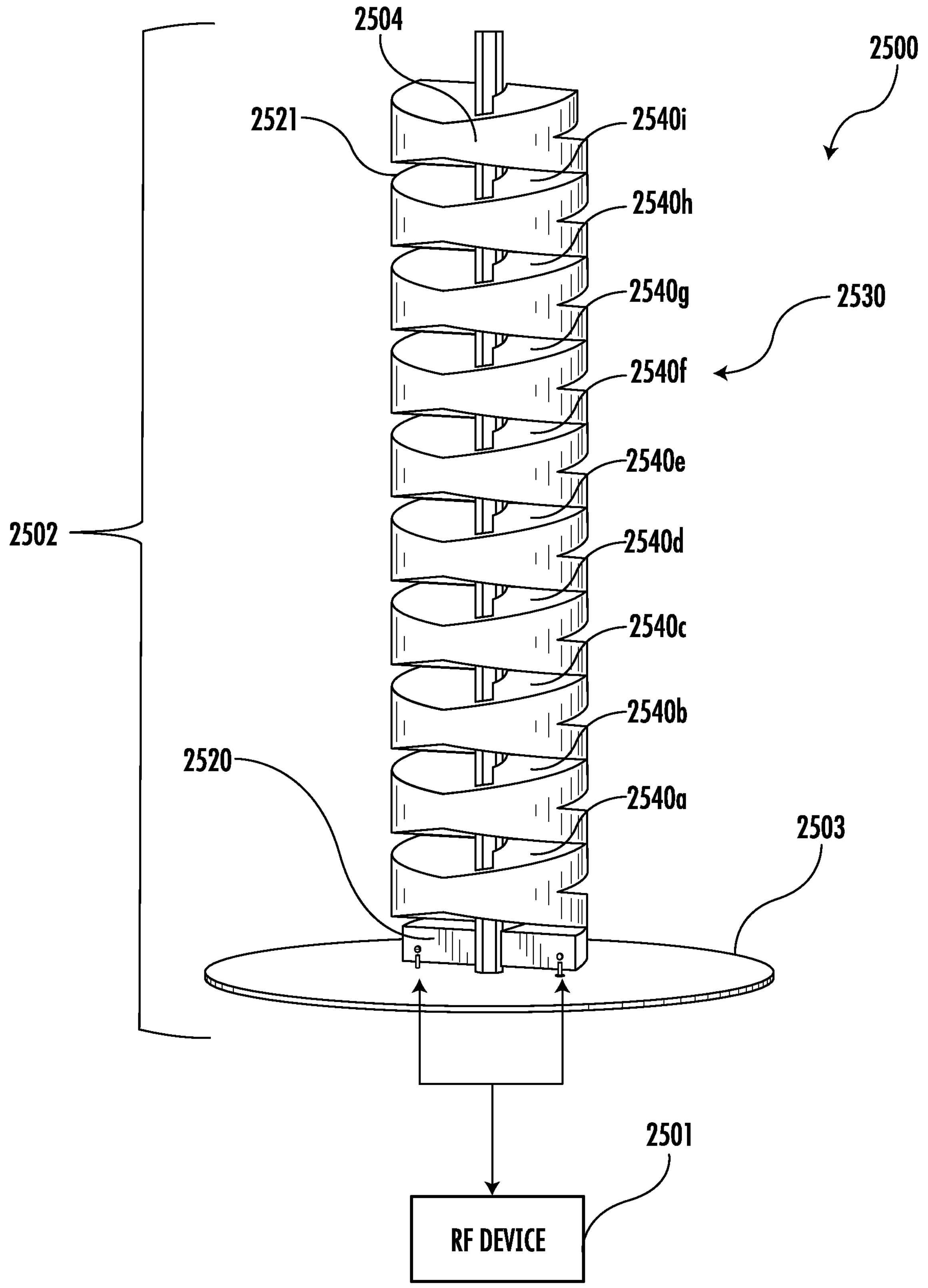
FIG. 18 is a perspective view of a communications device, according to a sixth example embodiment of the present disclosure.
Figure 19:
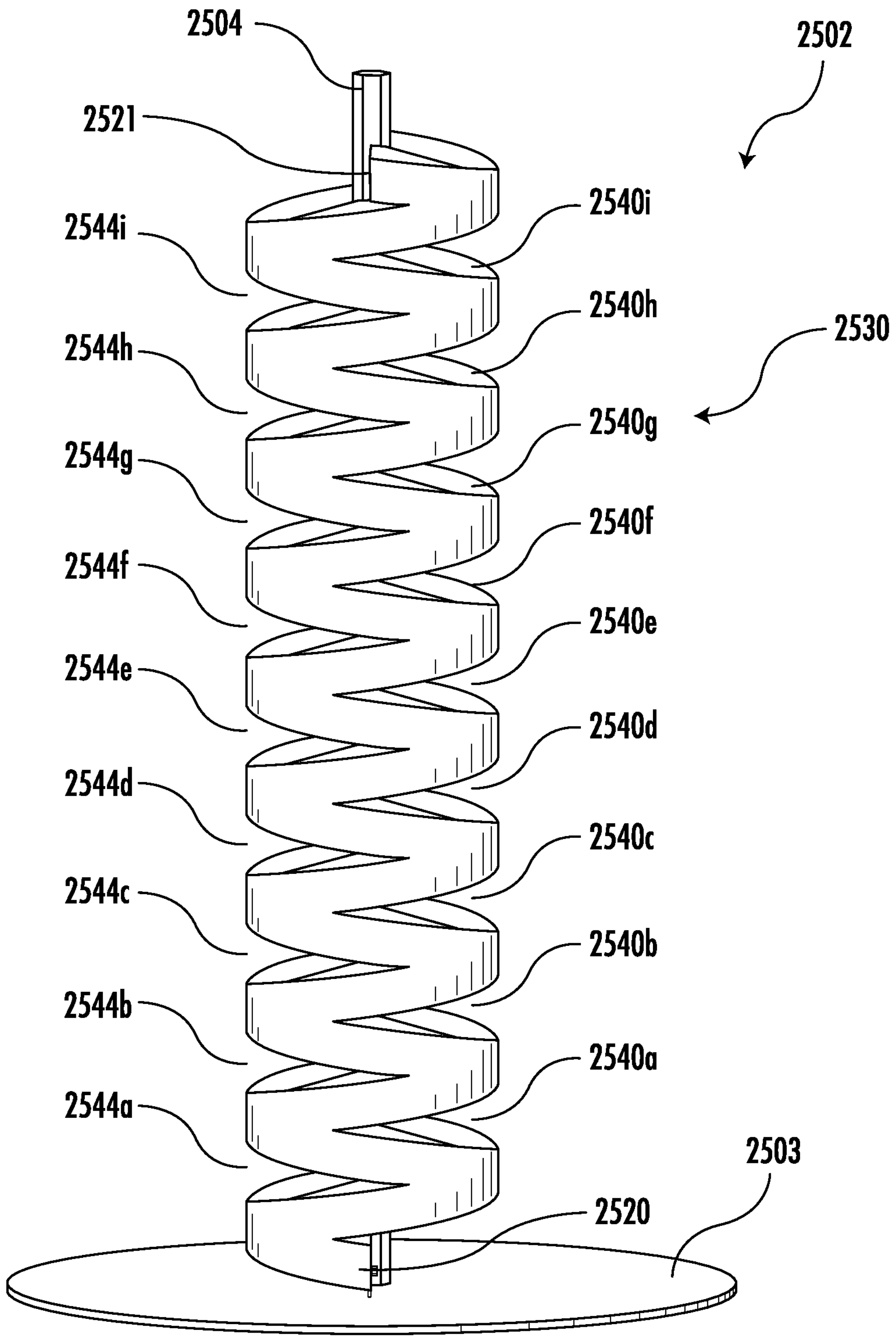
FIG. 19 is another perspective view of the communications device of FIG. 18.
Figure 20:
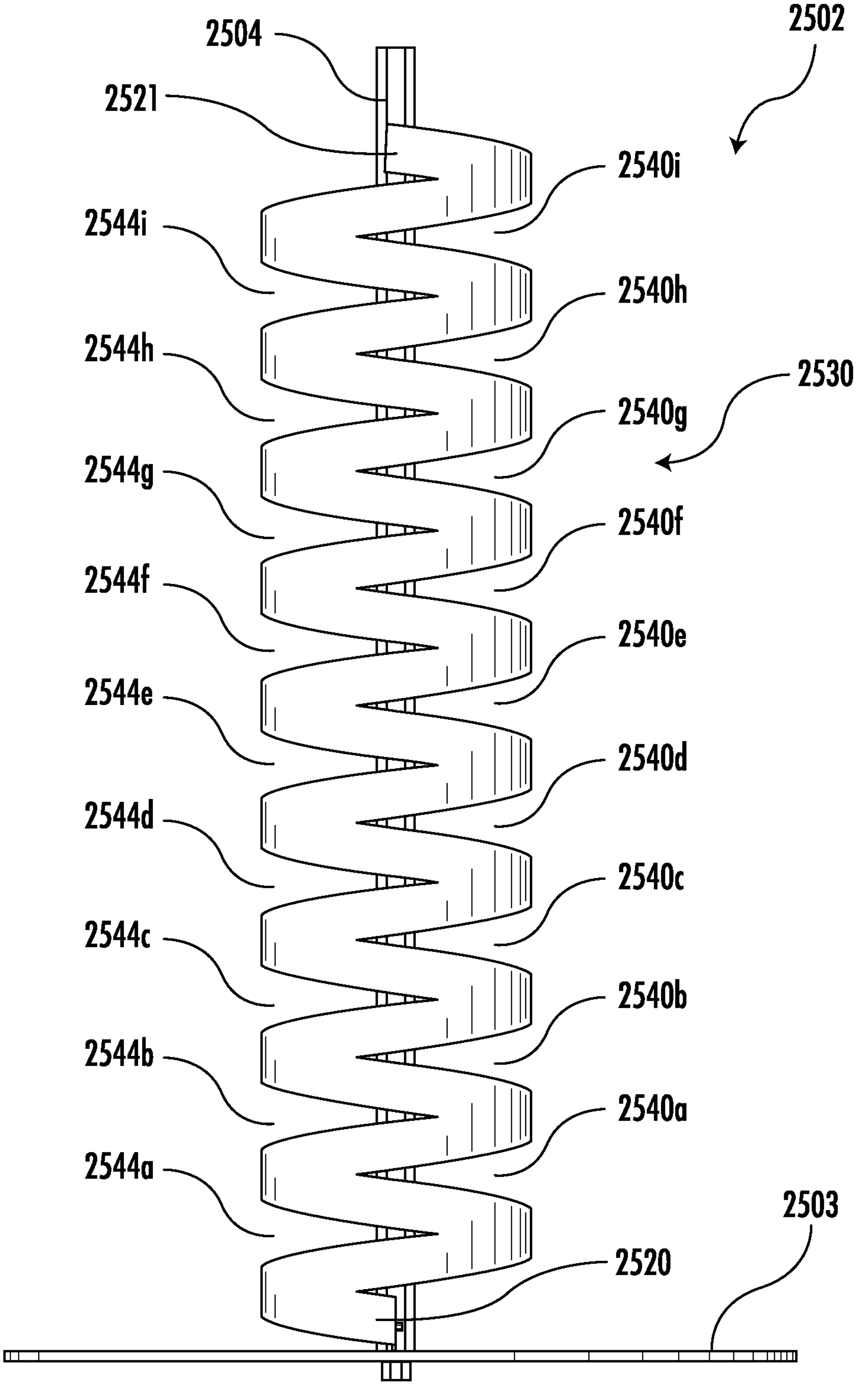
FIG. 20 is a side view of the communications device of FIG. 18.
Figure 21:
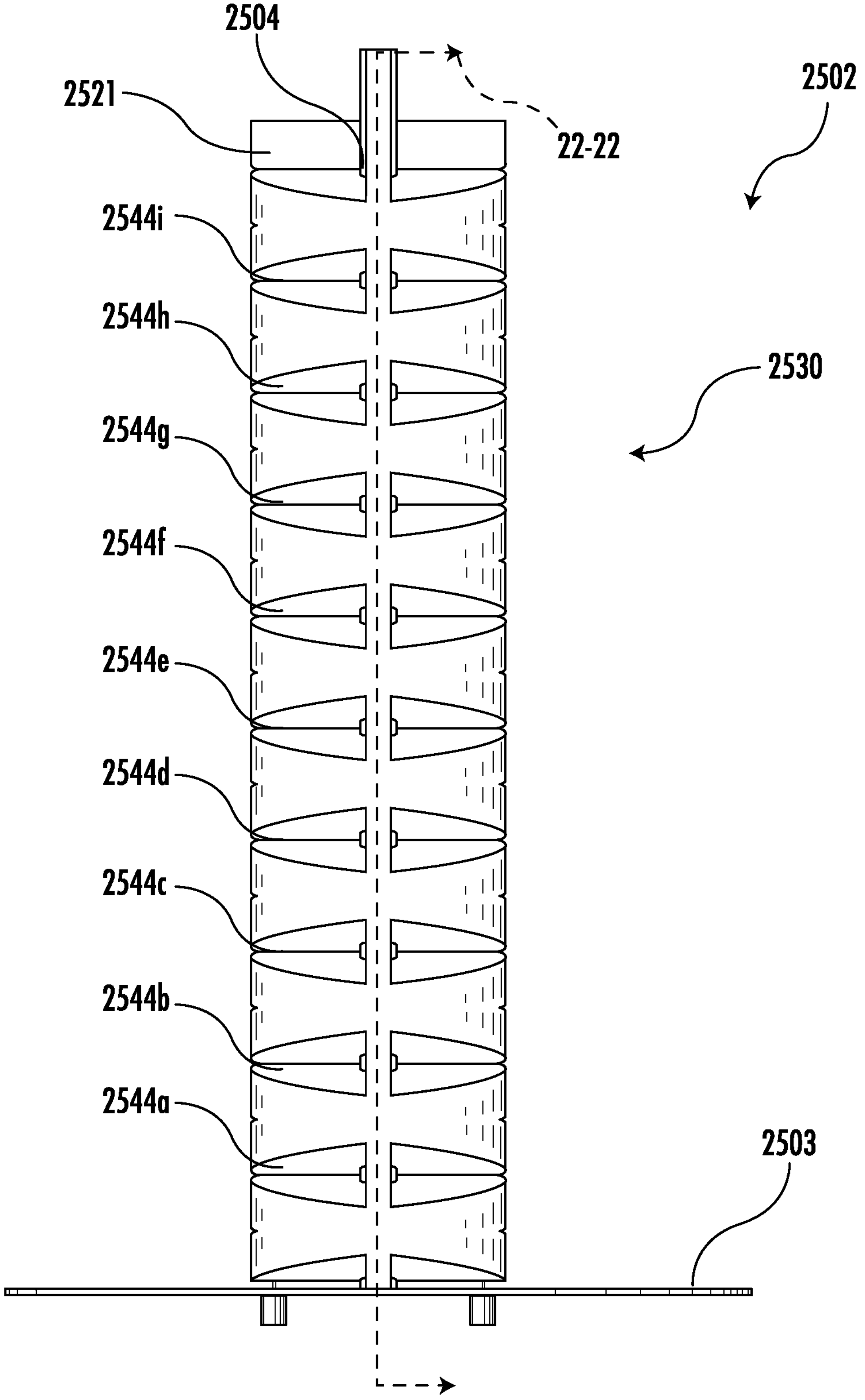
FIG. 21 is a front plan view of the communications device of FIG. 18.
Figure 22:
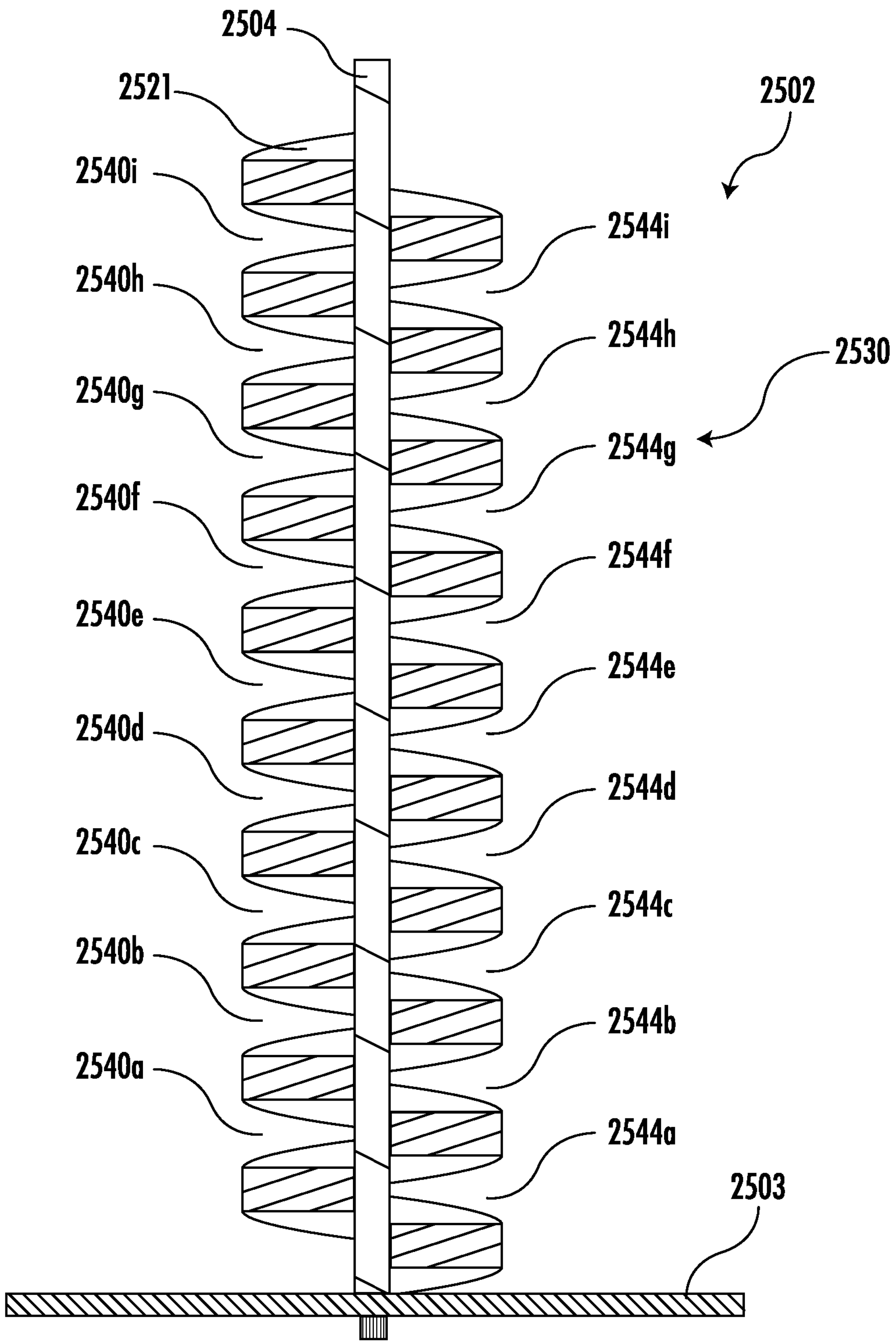
FIG. 22 is a cross-sectional view of the communications device of FIG. 21 along line 22-22.

Also, as will be appreciated, the geometry of the conductive body 2430 comprises two superimposed helical slot radiating antennas from the embodiment of FIG. 2. In the illustrated embodiment, the two superimposed helical slot radiating antennas are angularly spaced by 90°. In FIG. 13, the skeletons of the two superimposed helical slot radiating antennas are shown with dashed lines. In other embodiments, the two superimposed helical slot radiating antennas are angularly spaced in a range of 45°-315° (See FIG. 18, 180°). As will be appreciated, the plurality of vertically spaced rhombus shaped slots 2440*a*-2440*i* may be vertically offset in non-orthogonal embodiments.

Figure 14:
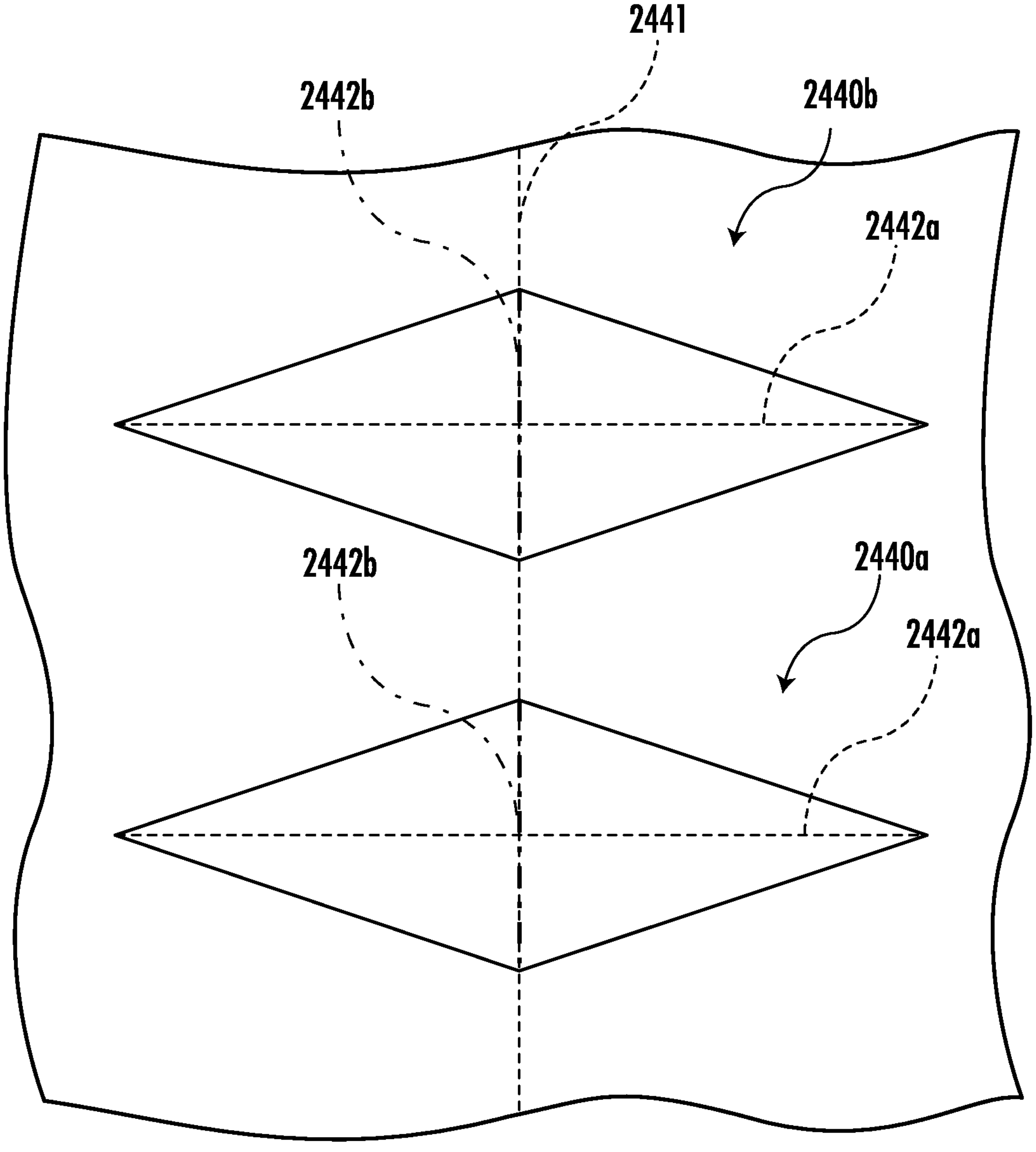
FIG. 14 is an enlarged front plan view of the communications device of FIG. 13.

As perhaps best seen in FIG. 14, each rhombus shaped-slot 2440*a*-2440*i* has an elongate first diagonal 2442*a* being substantially parallel (i.e. ±° 10 of parallel) with the conductive ground plane 2403, and a second diagonal 2442*b* aligned/overlapping with the vertical axis 2442. The elongate first diagonal 2442*a* has a length greater than that of the length of the second diagonal 2442*b*, providing for a diamond-shaped slot.

Figure 15:
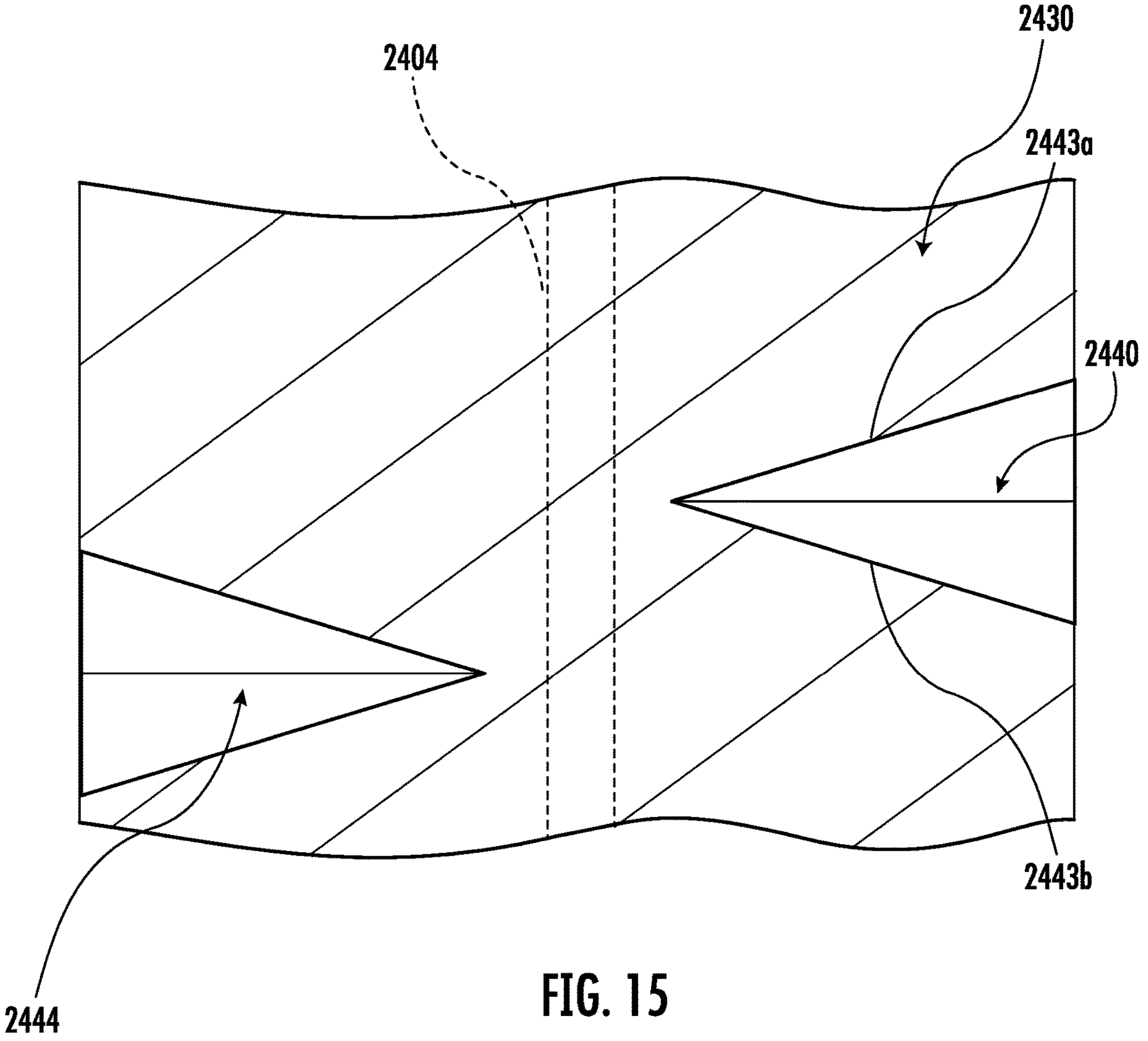
FIG. 15 is an enlarged cross-sectional view of the communications device of FIG. 13 along line 15-15.
Figure 16:
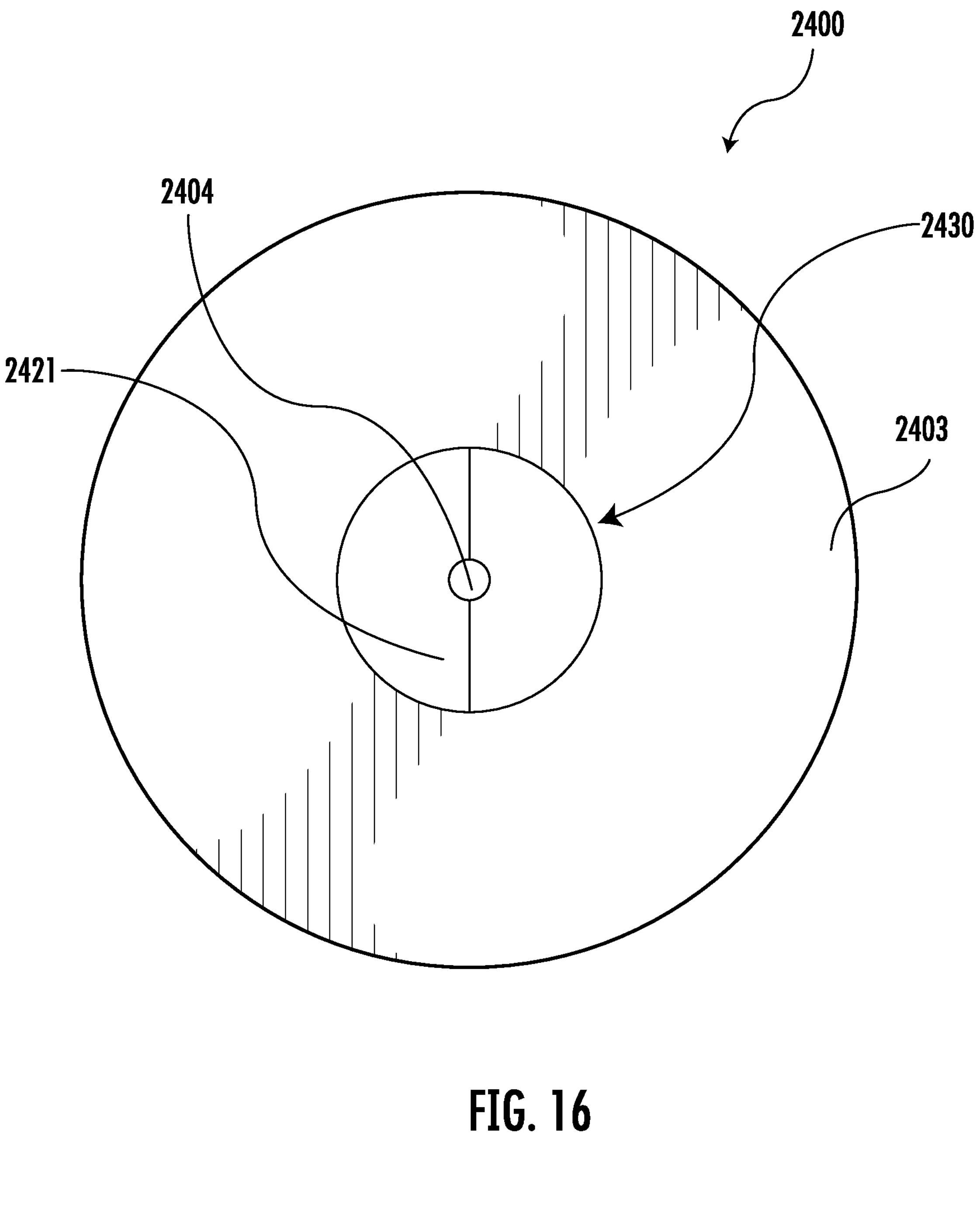
FIG. 16 is an enlarged top plan view of the communications device of FIG. 13.

As perhaps best seen in FIG. 15, each rhombus shaped-slot 2440*a*-2440*i* has tapered sides 2443*a*-2443*b* moving towards the conductive support rod 2404. The conductive ground plane 2403 illustratively includes has a width greater than a diameter of the conductive body.

Figure 17:
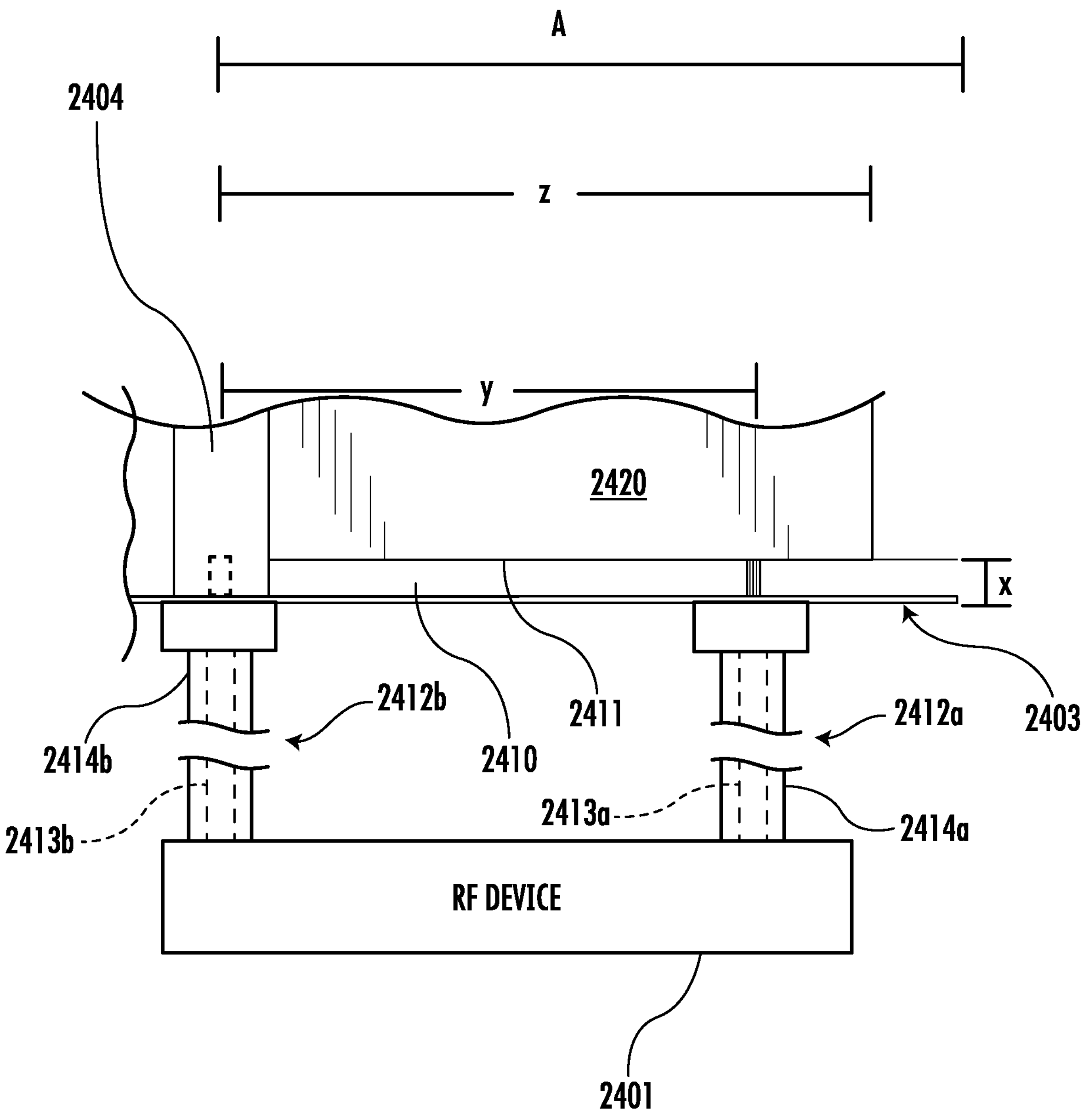
FIG. 17 is an enlarged side view of the communications device of FIG. 13.

Referring now additionally to FIG. 17, the communications device 2400 illustratively comprises a first coaxial cable 2412*a* coupling the RF device 2401 and the antenna 2402. The first coaxial cable 2412*a* comprises a first inner conductor 2413*a* and a first outer conductor 2414*b* surrounding the first inner conductor. The first outer conductor 2414*b* is coupled to the conductive ground plane 2403, and the first inner conductor 2413*a* extends through the conductive ground plane and is coupled to a proximal end 2420 of the conductive body 2430. The proximal end 2420 of the conductive body 2430 is adjacent the conductive ground plane 2403, and the conductive body also includes a distal end 2421 opposite the proximal end. The proximal end 2420 of the conductive body 2430 defines a first gap 2410 with adjacent portions of the conductive ground plane 2403.

The communications device 2400 illustratively comprises a second coaxial cable 2412*b* coupling the RF device 2401 and the antenna 2402. The second coaxial cable 2412*b* comprises a second inner conductor 2413*b* and a second outer conductor 2414*b* surrounding the second inner conductor. The second outer conductor 2414*b* is also coupled to the conductive ground plane 2403. The second inner conductor 2413*b* is coupled to the proximal end 2420 of the conductive body 2430 and is spaced apart from the first inner conductor 2413*a*.

In particular, and as perhaps best seen in FIG. 13, the first and second coaxial cables 2413*a*-2413*b* are coupled to the proximal end 2420 of the conductive body 2430 with an angular spacing of 90°. Also, the input signals may be fed respectively into the first and second coaxial cables 2413*a*-2413*b* with a phase spacing of 180°.

The antenna 2402 may have an operating frequency, and the conductive support rod 2404 may have a diameter between 0.2 and 0.4 wavelengths of the operating frequency, for example. A width of each rhombus shaped slot 2440*a*-2440*i* may be between 0.1 and 0.3 wavelengths of the operating frequency. A height of each rhombus shaped slot may be between 0.1 and 0.3 wavelengths of the operating frequency.

The operational characteristics of the communications device 2400 are set by the physical dimensions of the gap 2410 between a longitudinal edge 2411 of the conductive body 2430 and the conductive ground plane 2403. In particular, the input resistance of the communications device 2400 is determined by x (gap 2410), the distance between the longitudinal edge 2411 and the conductive ground plane 2403, and y, the radial distance between the conductive support rod 2404 and the first inner conductor 2413*a*. A smaller value of x will bring the driving resistance to a lower value, and a higher value of x will provide a higher driving resistance. The tuned frequency is set by z, a radial distance between the conductive support rod 2404 and an outer radial edge of the longitudinal edge 2411. The back lobe of the antenna 2402 is set by A, a radial distance between the conductive support rod 2404 and an outer radial edge of the conductive ground plane 2403.

Another aspect is directed to an antenna device 2402 for an RF device 2401. The antenna device 2402 comprises a conductive ground plane 2403, and a conductive support rod 2404 carried by the conductive ground plane and extending outwardly therefrom. The antenna device 2402 comprises a conductive body 2430 coupled to and surrounding the conductive support rod 2404. The conductive body 2430 has a plurality of vertically spaced rhombus shaped slots 2440*a*-2440*i* therein to define a radiating antenna.

Yet another aspect is directed to a method for making an antenna 2402 for a communications device 2400. The method includes forming a conductive ground plane 2403, and forming a conductive support rod 2404 to be carried by the conductive ground plane and extending outwardly therefrom. The method further comprises forming a conductive body 2430 coupled to and surrounding the conductive support rod 2404. The conductive body 2430 has a plurality of vertically spaced rhombus shaped slots 2440*a*-2440*i* therein to define a radiating antenna.

Referring now additionally to FIGS. 18-22, another embodiment of the communications device 2500 is now described. In this embodiment of the communications device 2500, those elements already discussed above with respect to FIGS. 2-3 are incremented by 500 and most require no further discussion herein. This communications device 2500 differs in that the geometry of the conductive body 2530 comprises two superimposed helical slot radiating antennas from the embodiment of FIG. 2. In the illustrated embodiment, as perhaps best seen in FIG. 18, the two superimposed helical slot radiating antennas are differently angularly spaced by 180°. In this embodiment, the plurality of vertically spaced rhombus shaped slots 2540*a*-2540*i* is more elongate than in the embodiment of FIGS. 13-17. The conductive body 2530 includes another plurality of vertically spaced rhombus shaped slots 2544*a*-2544*i* opposite the plurality of vertically spaced rhombus shaped slots 2540*a*-2540*i*.

Other features relating to communications devices are disclosed in co-pending applications: titled "COMMUNICATIONS DEVICE WITH HELICALLY WOUND CONDUCTIVE STRIP AND RELATED ANTENNA DEVICES AND METHODS," application Ser. No. 17/447,830; titled "COMMUNICATIONS DEVICE WITH HELICALLY WOUND CONDUCTIVE STRIP WITH LENS AND RELATED ANTENNA DEVICE AND METHOD," application Ser. No. 17/650,574; titled "COMMUNICATIONS DEVICE WITH RHOMBUS SHAPED-SLOT RADIATING ANTENNA AND RELATED ANTENNA DEVICE AND METHOD," all incorporated herein by reference in their entirety. It should be appreciated that any of the features from the embodiments of the communications devices disclosed in these related applications may be included in the communications device 2000. Also, as will be appreciated, the features of the disclosed communications devices 2000, 2100, 2200, 2300, 2400 may be combined.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A communications device comprising:
- a radio frequency (RF) device; and
- an antenna coupled to the RF device and comprising
  - a conductive ground plane,
  - a conductive support rod carried by the conductive ground plane and extending outwardly therefrom, and
  - a conductive body coupled to and surrounding the conductive support rod, the conductive body extending from the conductive support rod to define an outer radial edge, the conductive body having a helical slot extending from the conductive support rod to the outer radial edge of the conductive body and to define a helical slot radiating antenna, the conductive body having a proximal end defining a first gap with adjacent portions of the conductive ground plane; and
- a first coaxial cable coupling the RF device and the antenna, the first coaxial cable comprising an inner conductor and an outer conductor surrounding the inner conductor, the outer conductor coupled to the conductive ground plane and the inner conductor extending through the conductive ground plane and coupled to the proximal end of the conductive body.

2. The communications device of claim 1 wherein the conductive ground plane has a width greater than a diameter of the conductive body.

3. The communications device of claim 1 wherein the conductive ground plane comprises a conductive tuning body extending upwardly to define a second gap with the proximal end of the conductive body, the second gap being smaller than a width of the first gap.

4. The communications device of claim 1 wherein the antenna comprises a conductive disc element coupled to a distal end of the conductive support rod.

5. The communications device of claim 4 comprising a second coaxial cable coupling the RF device and the antenna, the second coaxial cable coupled to the conductive disc element.

6. The communications device of claim 5 wherein the second coaxial cable comprises an inner conductor, and an outer conductor surrounding the inner conductor, the inner conductor of the second coaxial cable helically wrapping around the conductive body and being coupled to the conductive disc element.

7. The communications device of claim 1 wherein the helical slot has an increasing helical pitch in a direction extending from the conductive ground plane.

8. The communications device of claim 1 wherein the helical slot has a varying diameter in a direction extending from the conductive ground plane.

9. The communications device of claim 1 wherein the antenna has an operating frequency; wherein the helical slot has a diameter between 0.9 and 1.3 wavelengths of the operating frequency; wherein the conductive support rod has a diameter between 0.2 and 0.4 wavelengths of the operating frequency; and wherein a thickness of each turn of the helical slot is between 0.1 and 0.3 wavelengths of the operating frequency.

10. An antenna device for a radio frequency (RF) device, the antenna device comprising:
- a conductive ground plane;
- a conductive support rod carried by the conductive ground plane and extending outwardly therefrom;

a conductive body coupled to and surrounding the conductive support rod, the conductive body extending from the conductive support rod to define an outer radial edge, the conductive body having a helical slot extending from the conductive support rod to the outer radial edge of the conductive body and to define a helical slot radiating antenna, the conductive body having a proximal end defining a first gap with adjacent portions of the conductive ground plane; and a first coaxial cable for coupling to the RF device, the first coaxial cable comprising an inner conductor and an outer conductor surrounding the inner conductor, the outer conductor coupled to the conductive ground plane and the inner conductor extending through the conductive ground plane and coupled to the proximal end of the conductive body.

11. The antenna device of claim 10 wherein the conductive ground plane has a width greater than a diameter of the conductive body.

12. The antenna device of claim 10 wherein the conductive ground plane comprises a conductive tuning body extending upwardly to define a second gap with the proximal end of the conductive body, the second gap being smaller than a width of the first gap.

13. The antenna device of claim 10 comprising a conductive disc element coupled to a distal end of the conductive support rod.

14. The antenna device of claim 13 wherein a second coaxial cable is coupled to the RF device, the second coaxial cable coupled to the conductive disc element.

15. The antenna device of claim 14 wherein the second coaxial cable comprises an inner conductor, and an outer conductor surrounding the inner conductor, the inner conductor of the second coaxial cable helically wrapping around the conductive body and being coupled to the conductive disc element.

16. The antenna device of claim 10 wherein the helical slot has an increasing helical pitch in a direction extending from the conductive ground plane.

17. The antenna device of claim 10 wherein the helical slot has a varying diameter in a direction extending from the conductive ground plane.

18. A method for making an antenna for a communications device, the method comprising:

forming a conductive body coupled to and surrounding a conductive support rod carried by a conductive ground plane and extending outwardly therefrom, the conductive body extending from the conductive support rod to define an outer radial edge, the conductive body having a helical slot extending from the conductive support rod to the outer radial edge of the conductive body and to define a helical slot radiating antenna, and the conductive body having a proximal end defining a first gap with adjacent portions of the conductive ground plane; and coupling a first coaxial cable to the antenna, the first coaxial cable comprising an inner conductor and an outer conductor surrounding the inner conductor, the outer conductor coupled to the conductive ground plane and the inner conductor extending through the conductive ground plane and coupled to the proximal end of the conductive body.

19. The method of claim 18 wherein the conductive ground plane has a width greater than a diameter of the conductive body.

20. The method of claim 18 wherein the conductive ground plane comprises a conductive tuning body extending upwardly to define a second gap with the proximal end of the conductive body, the second gap being smaller than a width of the first gap.

* * * * *